United States Patent [19]
Buchhop et al.

[11] Patent Number: 5,703,777
[45] Date of Patent: Dec. 30, 1997

[54] PARAMETRIC EMISSIONS MONITORING SYSTEM HAVING OPERATING CONDITION DEVIATION FEEDBACK

[75] Inventors: Thomas Robert Buchhop, Canton; Randall D'Alleva, St. Clair Shores; Ronald Keith Darnell, Ortonville; Jack Ryan Little, Metamora; Curtis Thomas Pedersen, Fenton, all of Mich.

[73] Assignee: ANR Pipeline Company, Detroit, Mich.

[21] Appl. No.: 326,716

[22] Filed: Oct. 20, 1994

[51] Int. Cl.$^6$ ............... G06G 7/70; F02C 9/00; F02B 47/08
[52] U.S. Cl. ............. 364/431.062; 364/431.061; 364/431.02; 364/431.01; 123/1 A; 123/27 GE; 123/568; 123/295; 60/39.281
[58] Field of Search ............. 364/431.01–431.08, 364/550, 551.01; 73/112, 116, 117.3, 115, 720; 123/696, 698, 688, 700, 425, 357, 435, 480, 672, 436, 419, 585, 695, 1 A, 27 GE, 23, 536, 545, 295; 60/285, 39.5, 39.53, 39.55, 39.281, 274, 278; 429/15–34; 322/2 R; 136/253, 248, 257

[56] References Cited

U.S. PATENT DOCUMENTS

| | | | |
|---|---|---|---|
| 4,026,251 | 5/1977 | Schweitzer et al. | 123/436 |
| 4,330,237 | 5/1982 | Battah | 73/112 |
| 4,465,033 | 8/1984 | Blaser | 123/295 |
| 4,571,534 | 2/1986 | Cover | 322/2 R |
| 4,584,654 | 4/1986 | Crane | 364/550 |
| 4,586,018 | 4/1986 | Bettman | 73/115 |
| 4,609,994 | 9/1986 | Bassim et al. | 364/551.01 |
| 4,650,728 | 3/1987 | Matsumura et al. | 429/19 |
| 4,756,979 | 7/1988 | Specht | 429/15 |
| 4,808,827 | 2/1989 | Woollam | 250/435 |
| 5,113,804 | 5/1992 | Kraus et al. | 123/1 A |

(List continued on next page.)

OTHER PUBLICATIONS

"A Predictive NO$_x$ Monitoring System for Gas Turbines", W.S.Y. Hung, Member ASME, Solar Turbines Incorporated, San Diego, California, pp. 1–7 Jun., 1991.

"Predictive NO$_x$ Monitoring System: An Alternative to In–Stock Continuous Emission Monitoring" W.S.Y. Hung, Ph.D., Chief Engineer, Combustion Engineering, Caterpillar, pp. 83–1 to 83–11, Jan. 1992.

"Automation of Existing Compressor Stations," Jack E. Little, ANR Pipeline Company, May 20–22, 1985.

*Primary Examiner*—Jacques Louis-Jacques
*Attorney, Agent, or Firm*—Dykema Gossett PLLC

[57] ABSTRACT

A parametric emissions monitoring system for monitoring stationary engine/compressor units coupled to a pipeline provides, in a reciprocating embodiment, reliable and accurate determinations of emission levels for NO$_x$, CO, and total hydrocarbons (THC) from an emissions matrix primarily as a function of engine speed and engine torque. Validation of the determined emissions level is provided by comparing the values of a set of actual engine operating parameters with a respective value in a set of calculated engine operating parameters to determine whether the deviation of the actual operating parameter from the expected operating parameter is within a defined range, and thus whether the engine is operating within a defined control envelope. Each set of engine operating parameters includes spark ignition timing, fuel rate, and air manifold pressure. When the comparison indicates that the actual engine operating parameters diverge from the respective expected engine operating parameter, the emissions are determined from the emissions matrix, and are subjected to a bias factor being assessed against the NO$_x$, CO and THC emissions level, the bias factor depending on the severity of the deviation. Moreover, these biased emission levels are further biased relatively up or down depending on selected ambient operating conditions, including relative humidity, power cylinder exhaust temperature deviation, and air manifold temperature.

29 Claims, 9 Drawing Sheets

U.S. PATENT DOCUMENTS

| | | | |
|---|---|---|---|
| 5,148,369 | 9/1992 | Uchinami et al. | 364/431.06 |
| 5,153,834 | 10/1992 | Abo et al. | 364/431.08 |
| 5,156,126 | 10/1992 | Ohkubo et al. | 123/425 |
| 5,163,412 | 11/1992 | Neu et al. | 123/700 |
| 5,222,471 | 6/1993 | Stueven | 123/695 |
| 5,224,461 | 7/1993 | Nakaniwa | 123/688 |
| 5,224,462 | 7/1993 | Orzel | 123/696 |
| 5,229,102 | 7/1993 | Minet et al. | 123/3 |
| 5,229,945 | 7/1993 | Demizu et al. | 364/431.04 |
| 5,243,852 | 9/1993 | Morita | 73/117.3 |
| 5,247,909 | 9/1993 | Simmons | 123/1 A |
| 5,248,567 | 9/1993 | Amemiya et al. | 429/20 |
| 5,356,487 | 10/1994 | Goldstein et al. | 136/253 |
| 5,539,638 | 7/1996 | Keeler et al. | 364/424.03 |

* ON SOME SYSTEMS THESE PARAMETERS ARE INPUTS TO ENGINE PROCESSOR.

24 HOUR ENGINE EMISSION REPORT

TIME: HH:00
DATE: MM/DD/YY

| ENGINE NUMBER | HORSEPOWER HOURS | ON-LINE HOURS | THC | TOTAL POUNDS CO | NOX |
|---|---|---|---|---|---|
| 1 | XX.X | XX.X | XXXX | XXXX | XXXX |
| 2 | XX.X | XX.X | XXXX | XXXX | XXXX |

| MONTHLY TOTAL TONS | | |
|---|---|---|
| THC | CO | NOX |
| XXXX | XXXX | XXXX |
| XXXX | XXXX | XXXX |

FIG. 5A

24 HOUR EMISSION ALARM REPORT

TIME: HH:00
DATE: MM/DD/YY

| ENGINE NUMBER | EMISSION ALARM HOURS | THC | TOTAL POUNDS DURING ALARM CO | NOX | FUEL TORQUE HOURS | THC | TOTAL POUNDS ON FUEL TORQUE CO | NOX |
|---|---|---|---|---|---|---|---|---|
| 1 | XX.X | XXXX | XXXX | XXXX | XX.X | XXXX | XXXX | XXXX |
| 2 | XX.X | XXXX | XXXX | XXXX | XX.X | XXXX | XXXX | XXXX |

FIG. 5B

PARAMETRIC EMISSIONS MONITORING SYSTEM HAVING OPERATING CONDITION DEVIATION FEEDBACK

TECHNICAL FIELD

This invention relates generally to a parametric emissions monitoring system for monitoring the emissions produced by a fuel operated apparatus, particularly a stationary internal combustion engine.

BACKGROUND OF THE INVENTION

In an effort to enhance the quality of the environment as well as comply with federal and state environmental regulations, the owners and operators of industrial stationary engines have found it necessary to monitor the combustion products of such engines to detect excessive levels of concernable emissions, such as $NO_x$, CO and TOTAL hydrocarbons (THC). Systems for such monitoring that are approved for use by the various environmental regulatory agencies typically involve monitoring the actual emissions of the source of the combustion products, and are sometimes known as Constant Emissions Monitoring Systems (CEMS). However, there are several significant disadvantages with the CEMS approach. First, this type of system is very expensive, as specialized test equipment is required, which must be maintained and periodically calibrated. Further, the cost is fixed regardless of the horsepower of the installation being monitored; thus relatively smaller installations bear a relatively increased operating cost burden. Moreover, operation of a CEMS is time consuming, thus increasing the overall expense of such a monitoring system. Second, there are inherent inaccuracies associated with obtaining a representative combustion product sample, since the monitoring results are accurate only when the sample is indicative of the entire combustion product. There are further factors that limit the accuracy of CEMS systems that are related to the conditioning of the sample for analysis and the measurement techniques used.

In response, there has been some progress in contemporary monitoring systems in developing a system that may be operated independent of actual, continuous emissions monitoring. These systems, however, wholly rely on predetermined emissions look-up tables and/or matrices, which output an emission of concern as a function of an engine operating parameter, such as, for example, engine speed for a natural gas internal combustion (IC) engine. The problem arises with the use of and reliance on such a system since the emissions level provided as an output fails to take into account the health or "tune" of the monitored engine. That is to say, these other systems read emissions from a predefined table without the benefit of feedback regarding the health of the engine; however, if the engine is not operating efficiently for some reason, actual emissions may increase to levels beyond those predicted by the tables. These systems thus provide unsatisfactory performance.

Thus, there is a need to provide an improved monitoring system for monitoring the emissions produced by a stationary engine that overcomes or minimizes the above-mentioned problems.

SUMMARY OF THE INVENTION

This invention provides for reliable and accurate determination of emission levels produced by energy conversion systems utilizing hydrocarbon based fuel. Systems advantageously employing this invention can be characterized as having an emissions matrix wherein an emission level is determined from the emissions matrix on the basis of key system operating parameters. However, when system efficiency degrades beyond a certain level, the emissions level from the emissions matrix may not reflect the emissions actually being produced by the system. Accordingly, in one aspect of the present invention, a method for monitoring emissions is provided that determines whether the system is operating within a control envelope (i.e., in "tune") and uses this result when determining emission levels.

The problems this invention solves are particularly prominent where stationary engines are used. Accordingly, in a second aspect of this invention, for reciprocating engines, the method of monitoring emissions is advantageously employed to stationary engines of the type characterized by an emissions matrix, wherein the matrix provides $NO_x$, CO and TOTAL hydrocarbon (THC) engine emission levels as a function of certain operating parameters including engine speed and engine torque. For turbine engines, the method of monitoring emissions is advantageously employed to stationary engines of the type characterized by an emissions algorithm, when the algorithm provides $NO_x$, CO and total hydrocarbon (THC) engine emission levels as a function of engine shaft speeds, relative humidity, exhaust gas temperature, turbine inlet temperature, regenerator pressure drop (where applicable), regenerator effectiveness (where applicable).

The method for insuring the accuracy of the emissions produced by a stationary engine includes several steps. First, the values of a set of process and unit operating parameters are measured. These parameters provide the information necessary to determine the above-mentioned emissions matrix and algorithm input parameters, and to determine whether the engine is operating in tune. Second, the values of a set of actual engine operating parameters is determined using the measured process and unit operating parameters. For the reciprocating engine embodiment, these parameters include engine fuel usage or rate, spark ignition timing, and air manifold pressure. For the turbine engine embodiment, these parameters include engine fuel usage or rate and axial compressor efficiency.

Third, the values of set of expected engine operating parameters are determined. Values of these parameters correspond to the tuned operation of the stationary engine. These parameters are the same as for the set of actual engine operating parameters (e.g., expected fuel rate for the reciprocating embodiment). Fourth, the actual engine operating parameters are compared with the expected engine operating parameters to determine the value of a respective operating parameter deviation. Finally, the emission levels are determined using the emissions matrix or algorithm, the process and unit parameter values, and the operating parameter deviation values. For example, a $NO_x$ level is determined as the function of engine speed and engine torque using the stationary engine emission matrix of the reciprocating embodiment. Further, if the engine is not operating within the set-point tolerances, an appropriate bias factor determined as a function of the operating parameter deviation values are applied to the emission levels so as to accurately represent the current emission level.

The parametric emissions monitoring system of this invention integrates information and controllability already existing within a separate stationary engine control system. Accordingly, in a third aspect of this invention, a system is provided for monitoring the emissions of a stationary engine. The system comprises five basic structural blocks.

First a means for measuring the values of a set of process and unit operating parameters, including a plurality of sensors for measuring certain of these parameters; second, a means for determining the actual engine operating parameter values using the process and unit operating parameters; third, a means for calculating the expected engine operating parameter values; fourth, a means for comparing the actual engine operating parameter values with the expected engine operating parameter values and generating an alarm signal when the deviation exceeds an emissions alarm limit; fifth and finally, a means for determining the emission parameter values produced by said engine. This invention uses redundant sensors to ensure availability of important information, thus providing improved reliability in the accuracy of the emission level determination.

Thus, the parametric emissions monitoring system of the present invention performs a very important validation function prior to making an emissions determination. Others have attempted to "estimate" emissions based on certain operating parameters without this important feedback information regarding the operation of the subject engine. Without closing the loop as does this invention, the "estimate" of emission levels is merely a prediction; the system of the present invention is truly parametric in nature as a plurality of operating parameters, which were controlled when the emissions map was determined and thus form a basis for emissions matrix and algorithm accuracy, are verified and biased prior to making emission level determinations.

Other objects, features and advantages will become clear or will be made apparent during the course of the following description of a preferred and other embodiments of the present invention.

BRIEF DESCRIPTION OF THE DRAWINGS

FIGS. 5A and 5B depict exemplary emissions reports, including the emissions determined in accordance with the block diagram of FIG. 4;

DETAILED DESCRIPTION PREFERRED EMBODIMENTS

Figure 1:
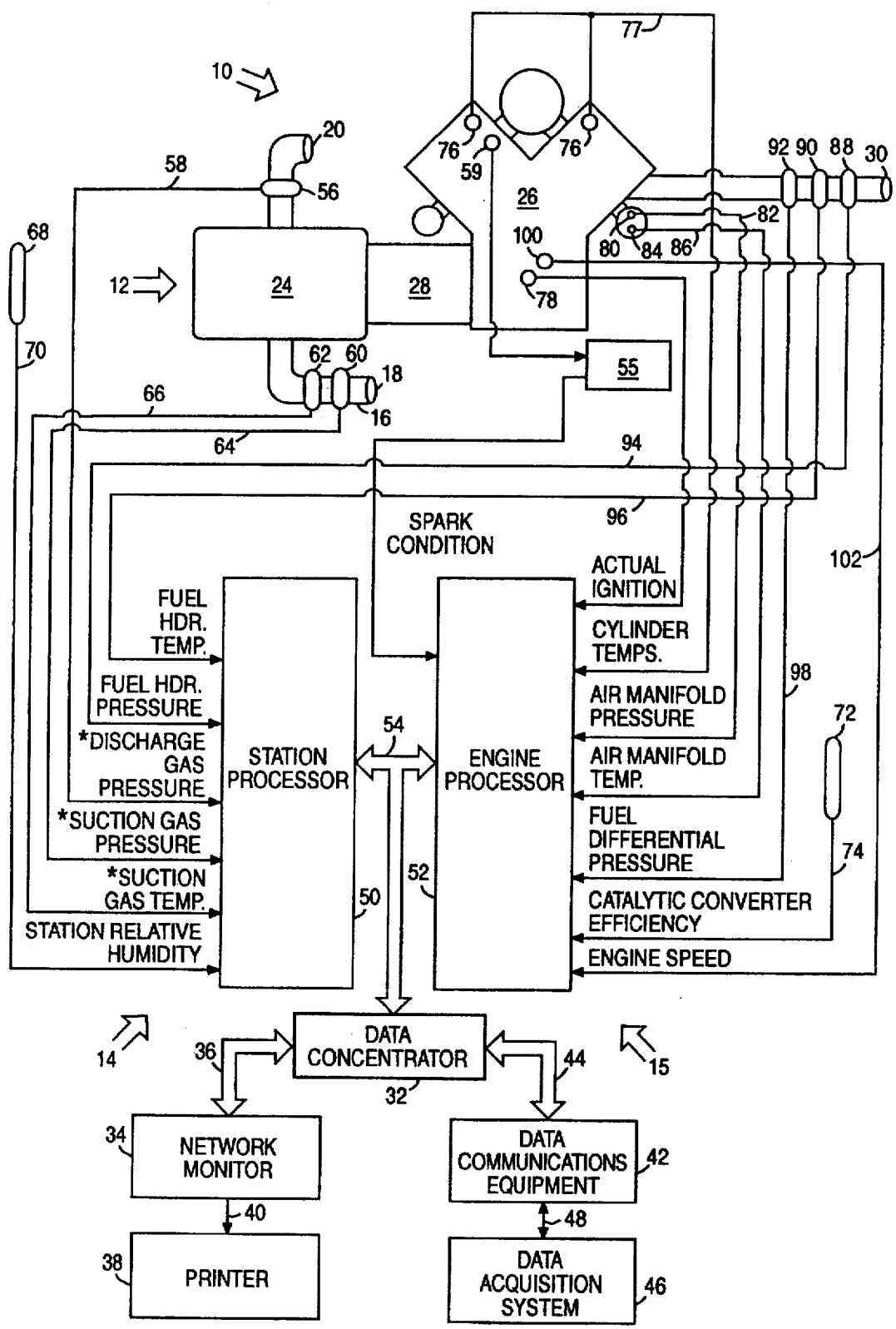
FIG. 1 is a combined block and diagrammatic view of a system in accordance with the present invention for monitoring the emissions of a stationary reciprocating internal combustion engine and compressor unit.

Before proceeding to a description of the inventive Parametric Emissions Monitoring System (PEMS) referenced to the drawings, a general overview with reference to a preferred embodiment of the PEMS will be set forth.

The basic theory of the PEMS is that there exists a relationship between the emissions produced by an engine and certain key engine operating parameters. Thus each engine or engine type has a signature emissions map or matrix that provides emission levels as a function of these key parameters. If this emissions map is determined for a tuned engine based on actual measured emissions, prior to being placed in service, then, so long as the engine remains tuned, emission values taken from the predetermined emissions map will accurately reflect the actual emissions being produced by the engine. In this way, the need for continuous actual emissions monitoring is eliminated.

The emissions of concern that may be monitored by the PEMS generally comprise oxides of nitrogen ($NO_x$), carbon monoxide (CO) and TOTAL hydrocarbons (THC). The broad category of THC typically further comprises subcategories that are often of interest to various federal and state environmental regulatory agencies, and may be derived from THC. These subcategories include volatile organic compounds (VOC) and non-methane hydrocarbons (NMHC).

In designing a PEMS, it is desirable to select those engine operating parameters that are primarily determinative of the levels of the above-mentioned emissions of concern as the key engine operating parameters for use in the PEMS. It is known to those of ordinary skill in the art that engine speed and torque are major factors influencing $NO_x$ and CO emissions. Engine speed, in revolutions per minute (RPM), determines the amount of time that the combustible mixture of fuel and air is subjected to the relatively higher engine cylinder temperatures. Engine speed thus affects the formation of $NO_x$ and CO according to a residence time mechanism. For example, a lower engine speed means a longer residence time of the air/fuel mixture in the combustion chamber, which results in increased $NO_x$ and decreased CO emission rates. Thus, at constant torque, $NO_x$ emissions rates increase and CO emissions rates decrease as engine speed decreases; similarly, $NO_x$ rates will decrease and CO rates will increase as engine speed increases.

The engine torque operating parameter works in an opposite manner to that of engine speed, causing the opposite effect on the formation of $NO_x$ and CO. As engine torque increases, more fuel and air are injected into the combustion cylinder. This increase in the amount of the air/fuel mixture results in increased cylinder pressure accompanied by increased combustion temperature and, as described in the preceding paragraph increased $NO_x$ and decreased CO emission rates. Thus, at constant engine speed, $NO_x$ emission rates decrease and CO emission rates increase as engine torque decreases; similarly, $NO_x$ rates increase and CO rates decrease as engine torque increases.

Although engine speed and torque are primary indicators of engine exhaust emission levels, the air/fuel ratio, the spark ignition timing, and the rate at which fuel is used by the engine are parameters that affect emissions and, further, can be used to determine whether the engine is in "tune." Moreover, the air/fuel ratio and spark ignition timing can be controlled to affect engine performance, particularly engine "tune."

Air manifold temperature is also an important factor in that it is used to bias ignition timing and air fuel ratio but also is a biasing factor for the emission matrix.

The air/fuel ratio is defined as the mass flow ratio of air to fuel which is injected and burned within a cylinder. The air/fuel ratio affects the combustion temperature of the air/fuel mixture, the combustion temperature being highest at or near the stoichiometric mixture. Stoichiometry refers to a chemically correct mixture of air and fuel (approximately 17 parts air to 1 part fuel-natural gas) whereby all molecules of each component are burned completely during the combustion process. Maximum $NO_x$ and relatively lower CO emissions occur at air/fuel ratios slightly lean of stoichiometric, as excess oxygen becomes available. The formation of $NO_x$ decreases as the air/fuel ratio either increases or decreases from this point due to the cooling effect of the excess air or fuel. Carbon monoxide emissions typically increase on either side of this point due to insufficient air being available for complete combustion.

Spark condition relates to the spark event which occurs at the time the spark plugs fire to initiate combustion. Spark condition affects $NO_x$ formation due to its effect on engine peak cylinder pressure and temperature. A mis-fire condition will reduce the ability of the cylinder to burn its air/fuel mixture properly, thus causing the remaining cylinders on the engine to pick up the load. This mis-fire condition, when present, results in an overall increase in engine $NO_x$ emissions.

Spark ignition timing relates to the position of a power cylinder relative to a reference position (e.g., top dead center) at the time the spark plugs fire. Spark ignition timing affects $NO_x$ formation due to its effect on peak cylinder pressure and temperature. To a degree, advancing spark ignition timing so that combustion occurs earlier in the cycle increases the residence time and peak cylinder pressure, which is directly related to peak combustion temperature and $NO_x$ formation. Thus, the level of $NO_x$ formation increases as spark ignition timing is advanced. In contrast, retarding spark ignition timing increases fuel consumption because more energy is released later in the combustion cycle, which depresses peak cylinder temperature. As a result, $NO_x$ formation decreases as spark ignition timing is retarded.

The actual fuel consumption rate of an engine is an important indicator of the engine's operation. When the actual fuel rate value is within a certain percentage of a calculated fuel rate value, an intelligent system can infer that the engine is operating efficiently (i.e., the engine has maintained its "tune"). Importantly, then, this fuel rate comparison can be used to indicate whether the emissions values taken from the above-mentioned emissions matrix, which was generated via collected "tuned" engine emissions data, accurately correlate to the emissions actually being produced by the monitored engine.

The Parametric Emissions Monitoring System of the present invention is preferably a partial overlay of an engine/compressor operating and control system. Referring now to the drawings wherein like reference numerals are used to reference identical components in various views, FIG. 1 depicts a compressor station 10, a preferred environment in which the inventive PEMS may be advantageously employed. The compressor station 10 comprises compressing means 12 and a station control system 14. The compressing means 12 is included in compression station 10 for providing sufficient fluid power to ensure the proper progress of a transported fluid, for example natural gas, through a pipeline.

Station 10 further includes a Parametric Emissions Monitoring System (PEMS) 15, which advantageously utilizes processing capacity and associated control apparatus already existing in control system 14. Although PEMS 15 utilizes many of the existing components of control system 14, it should be appreciated that this arrangement is not required for the present invention; a completely separate system for monitoring emissions may be implemented and fall within the scope of the invention. The compressing means 12 is coupled to a pipeline 16 having a gas inlet 18 and a gas outlet 20. It should be understood that there may be a plurality of compressing stations 10 along a section of pipeline 16 to ensure that the fluid being pumped through the pipeline 16 flows smoothly and efficiently. The station 10 includes an individual compressing unit 12, which comprises a pump compressor 24 operated by a compressor motor 26 via linkage means, or drive shaft 28. The compressor 24 is preferably a reciprocating type compressor and is well known in the art. The pump motor 26 may be a fuel operated prime mover, and is a fuel operated reciprocating engine in the preferred embodiment of the present invention. The reciprocating engine 26 is fed by an inlet fuel line 30. Although FIG. 1 depicts a single engine/compressor unit coupled to pipeline 16, it should be appreciated that in practice a plurality of such engine/compressor units may be provided at each compressor station 10.

The control system 14 is included in compressor station 10 for providing a means of receiving for input, various operating parameters of station 10, and for controlling the operation of the individual engine/compressor units. The control system 14 includes, and PEMS 15 utilizes, a data concentrator 32, a network monitor 34 connected to data concentrator 32 via data highway 36, and a printer 38 connected to network monitor 34 via interface 40. The data concentrator 32 concentrates data provided by control system 14 and forwards the concentrated information to network monitor 34. The network monitor 34 is the man/machine interface which allows an operator at station 10 to communicate with the control system 14/PEMS 15. Further, monitor 3A has the capability of logging selected engine/compressor unit and station operating parameters (e.g., engine speed) into "trend" reports. These reports show how the selected parameters vary as a function of time. Further, network monitor 34 may print emissions reports, alerts, and alarms on printer 38 via interface 40.

The data concentrator 32 is further connected to data communications equipment 42 via data highway 44 for communication by control system 14/PEMS 15 with a centralized Data Acquisition System (DAS) 46 via communications facility 48. The data communications equipment 42 may take the form of a modem, and facility 48 may take the form of a primary, dedicated leased line, or, for providing back-up connectivity, a dial-up line established over the public switched telephone network. The control system 14/PEMS 15 may be controlled from, receive commands from, and supply information to, DAS 46 via data highway 44, modem 42, and facility 48.

The control system 14/PEMS 15 further includes a station remote terminal unit (RTU) or processor 50, and an engine RTU or processor 52 in communication with data concentrator 32 via data highway 54. Each station 10 preferably includes one station processor 50, and one engine processor 52 for each engine 26 provided at station 10; FIG. 1 depicts only one engine processor 52/engine combination for purposes of clarity. Processors 50 and 52 may be RTU Model 3350, commercially available from Bristol Babcock Company. Each processor 50 and 52 includes central processing means (not shown), Random Access Memory (RAM) (not shown), and Read-Only Memory (ROM) (not shown), and Input/Output interface means (not shown). Each processor 50 and 52 stores predetermined data, for example in RAM, for station 10 operation, including engine 26/compressor 24 operating data.

The PEMS 15 is partially based on processes or routines performed under stored program control. These routines are preferably, primarily performed in engine processor 52 to monitor the emissions of the monitored engine 26; however, it should be appreciated that given the comprehensive communication capabilities provided by data highway 54 various ones of the software routines may also be performed on station processor 50.

The control system 14/PEMS 15 further includes a spark condition monitor 55 for processing preselected sensed aspects related to the spark event, for example, the voltage magnitude and duration of a respective signal applied to at least one spark plug at each cylinder to cause a spark to ignite the air/fuel mixture. The system 14 includes two spark plugs per power cylinder; accordingly, the above-mentioned data related to each spark plug per power cylinder is processed by spark condition monitor 55. The monitor 55 is operative to process these signals and generate a spark condition signal which is indicative the spark event(s) occuring in engine 26, and thus provide a gauge or measure of the health of operation of engine 26. The spark condition signal will be described in greater detail below.

Various sensors are included in the control system 14/PEMS 15 to detect or sense selected engine/compressor and station parameters. The PEMS 15 includes a discharge gas pressure sensor 56 connected to station processor 50 via connecting line 58, a plurality of spark sensors 59 connected to spark condition monitor 55, a suction gas pressure sensor 60 and a suction gas temperature sensor 62 connected to station processor 50 via respective connecting lines 64 and 66, a station relative humidity sensor 68 connected to station processor 50 via connecting line 70, a catalytic converter efficiency sensor 72 connected to engine processor 52 via line 74, cylinder temperature sensors 76 connected to engine processor 52 via line 77, an actual ignition timing sensor 78 connected to engine processor 52, air manifold pressure sensor 80 connected to engine processor 52 via line 82, and an air manifold temperature sensor 84 connected to engine processor 52 via line 86. The fuel supplied to each engine 26 is sensed by a fuel supply pressure sensor 88, a fuel supply temperature sensor 90, and a fuel differential pressure sensor 92. The fuel pressure sensor 88 and the fuel temperature sensor 90 are connected to station processor 50 via respective lines 94 and 96. The fuel differential pressure sensor 92 is connected to engine processor 52 via line 98. The speed of engine 26 is detected by an engine speed sensor 100 and is connected to engine processor 52 via line 102. These sensors are well known to those in the art. Fuel supply pressure and fuel supply temperature values are typically very stable and if they deviate from a preset value range will revert to a fall back value.

The sensors 56, 60, 80, 84, 88, 90, and 92 are preferably included in PEMS 15 as a plurality of individual sensors to thereby provide redundant operating parameter information, selectable under software control, to the station and engine processors.

The sensors 59 respectively detect or sense the peak voltage and duration of the signal applied to a respective spark plug (not shown) and generating respective signals indicative of the detected magnitude and duration. The sensors 60 and 62 respectively detect the pressure and temperature of the fluid being introduced into pump compressor 24 and generate a respective signal indicative of the detected operating parameter. Particularly, where station 10 includes a plurality of engine/compressor units, it should be appreciated that sensors 60 and 62 may detect pressure and temperature of the fluid being introduced at the station header. Similarly, discharge pressure sensor 56 detects the discharge pressure of the fluid being compressed by pump compressor 24 and generates a signal indicative of the pressure parameter detected. The relative humidity sensor 68 detects the ambient relative humidity at station 10 and generates a signal indicative of the detected relative humidity. If engine 26 is provided with a catalytic converter in the exhaust stack, then the emissions system may be provided with catalytic converter efficiency sensor 72 for detecting the efficiency of the installed converter and for generation a signal indicative of that efficiency for use in determining released emissions. The power cylinder temperature sensors 76 comprise a plurality of individual sensors, at least one for each of the cylinders in engine 26. Each sensor 76 detects the temperature at a respective cylinder and generates a respective signal indicative of the temperature parameter detected. For clarity, not every sensor 76 is shown and only one line 77 is shown in FIG. 1. The actual ignition timing sensor 78 detects the actual ignition timing and generates a signal indicative of the detected timing. The pressure and temperature sensors 80 and 84 are disposed relative to engine 26 such that the air manifold pressure and air manifold temperature parameters may be respectively detected and a respective signal indicative of the detected parameter may be generated. Fuel consumption is determined via a fuel rate using a fuel differential pressure sensor 92. Sensor 92 is in the fuel meter run for each of the engines so equipped. The fuel differential pressure sensor 92 measures the differential pressure across an orifice plate which arises due to fuel flow and generates a signal indicative of the detected differential pressure. The engine speed sensor 100 detects engine speed and generates a signal indicative of the engine speed. The station and engine processors receive these signals as inputs, measure the values of the signals, and, in turn, calculate the corresponding value of the parameter being detected.

Figure 2:
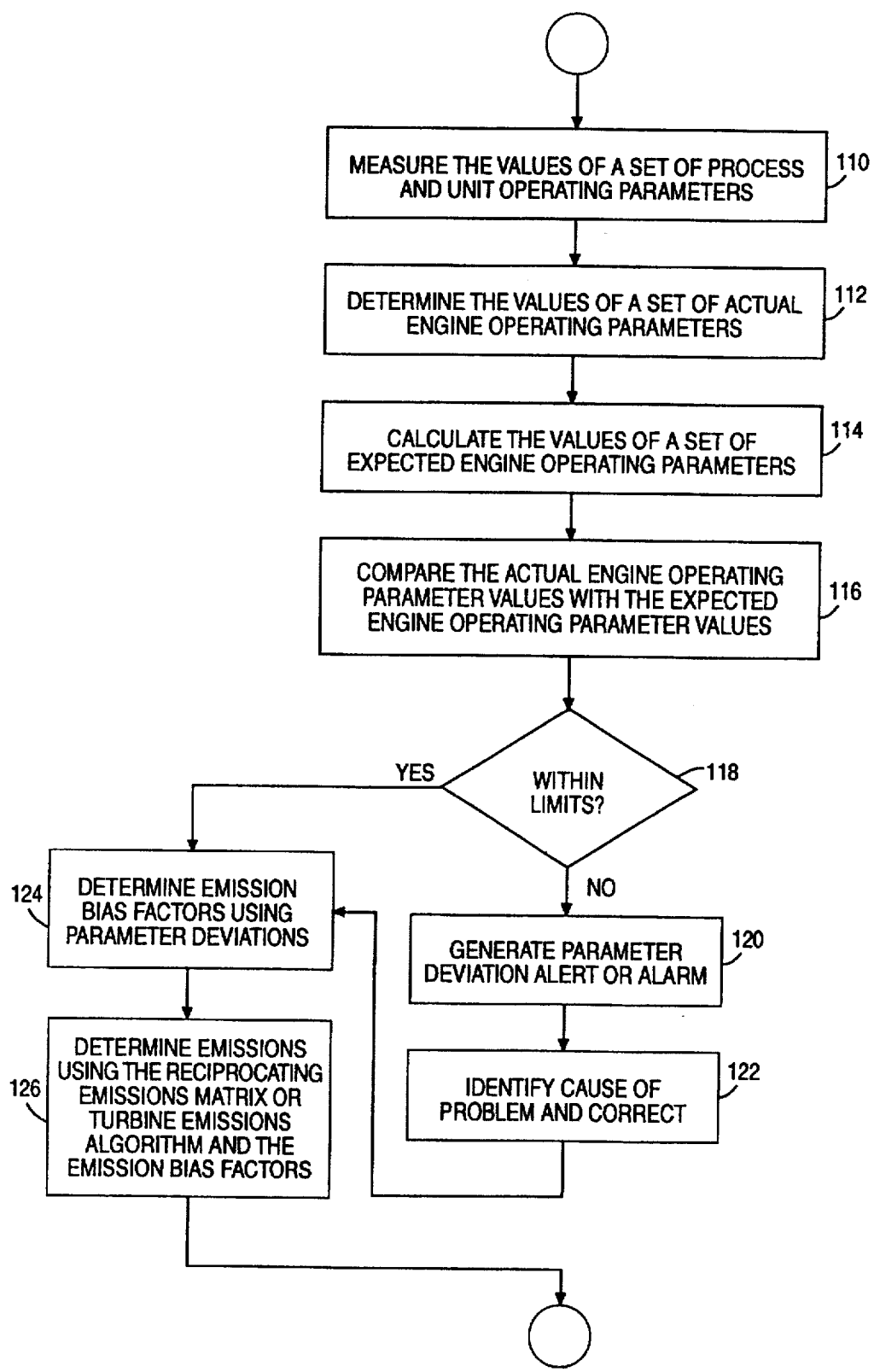
FIG. 2 is a flow chart diagram depicting the method steps of the present invention.

Referring now to FIG. 2, the method steps of the present invention are depicted. The method begins in an initial or start state, then proceeds to step 110. In step 110, the values of a set of process and unit operating parameters are measured. Broadly speaking, the set of process and unit operating parameters comprises various engine 26 operating parameters, pump compressor 24 operating parameters, and pipeline 16 fluid flow parameters. This set of process and unit operating parameters is sufficient to both determine whether engine 26 is operating within a predefined control envelope (i.e., whether the engine is operating in "tune"), and to determine emission levels of a set of emission product parameters.

In step 112, the values of a set of actual engine operating parameters are determined using at least certain ones of the values of the set of process and unit operating parameters. The set of actual engine operating parameters includes parameters of engine 26 that are indicative of whether the engine is in "tune" or not (i.e., whether engine 26 is operating within the control envelope). Broadly speaking, actual engine operating parameters may include actual fuel flow rate.

In step 114, the values of a set of expected engine operating parameters are calculated using at least certain of the values of the set of process and unit operating parameters. The parameters in the set of expected engine operating parameters correspond to the parameters in the set of actual engine operating parameters; however, the values assigned to the respectively corresponding parameters may differ depending on whether or not the engine is operating efficiently. Broadly speaking, expected engine operating parameters may include calculated fuel flow rate, which corresponds to actual fuel flow rate in the set of actual engine operating parameters.

In step 116, the actual engine operating parameter values are compared with the expected engine operating parameter values. This comparison step makes an initial determination of whether the engine is operating in tune and thus whether subsequent emission determinations will require biasing. This comparison step forms an important validation function within the parametric emissions monitoring system 15. Others have attempted to "estimate" emissions based on certain operating parameters without important feedback information regarding the health or efficiency of the engine operation. Without closing the loop as the subject invention does, the "estimate" of emission levels is merely a prediction; the system of the present invention is truly parametric in nature as a plurality of operating parameters, which formed the underlying basis when the emissions matrix was initially determined, are verified prior to making emission level determinations.

Further, in step 118 the degree to which the actual engine operating parameter values diverge from the expected engine operating parameter values is tested against predefined limits. The present invention preferably provides for two levels of divergence: a first, less serious level of divergence, designated an ALERT level, indicates that a greater than nominal degree of divergence has been detected but the divergence is not so great as to require specific action, and a second, greater level of divergence, designated an ALARM level, indicates that a higher than desired divergence condition exists in the system and that facility personnel, for example, at station 10, will respond and correct within a specified period of time. It should be appreciated that whether in alert or alarm condition, the ability of the system 15 to determine emission levels is not affected due to the biasing method which has been implemented as will be described in greater detail below. The method continues at 120, where a parameter ALERT or ALARM is generated if the respective parameter deviation limit has been exceeded. If alert limits have been exceeded, a warning is output by PEMS 15 to network monitor 34, DAS 46, or printer 38. However, if the divergence between the respective actual engine operating parameter values and the respective expected engine operating parameter value is greater than the respective alarm limit in step 118 (and thus engine 26 is not operating within the control envelope), then a parameter alarm is generated, wherein an operator at station 10 via network monitor 34 and/or printer 38 is notified of the operating abnormality. Further, the Data Acquisition System 46 may be notified via data highway 44, modem 42 and facility 48. The method proceeds to step 122 where the cause of the problem is identified and corrected following a predetermined response procedure.

The method proceeds to step 124 where emission bias factors are determined for each concernable emission using respective parameter deviations, as determined during comparisons and testing against limits described above in steps 116 and 118. It should be appreciated that there are two paths to step 124; one step proceeds directly from step 118 where actual engine operating parameters are within deviation limits of expected engine operating parameters, and a second path is via steps 120, and 122 where engine operating parameter deviations warrant PEMS 15 generating a parameter deviation alert or alarm. Thus, step 124 is performed in either event; the emission bias factors being determined as a function of the engine operating parameter deviation values. This continuous range of bias factor values based on operating parameter deviations allows PEMS 15 to accurately and continuously calculate highly accurate emission rates.

The method next proceeds to step 126, where emissions are determined using an emissions structure, which may take the form of a map, matrix (for a reciprocating embodiment), or algorithm (for a turbine embodiment), and the emission bias factors. It should be appreciated that the emission bias factors modify the determined emissions from the emissions matrix or algorithm relatively upward or relatively downward.

RECIPROCATING ENGINE EMBODIMENT

Figure 3A:
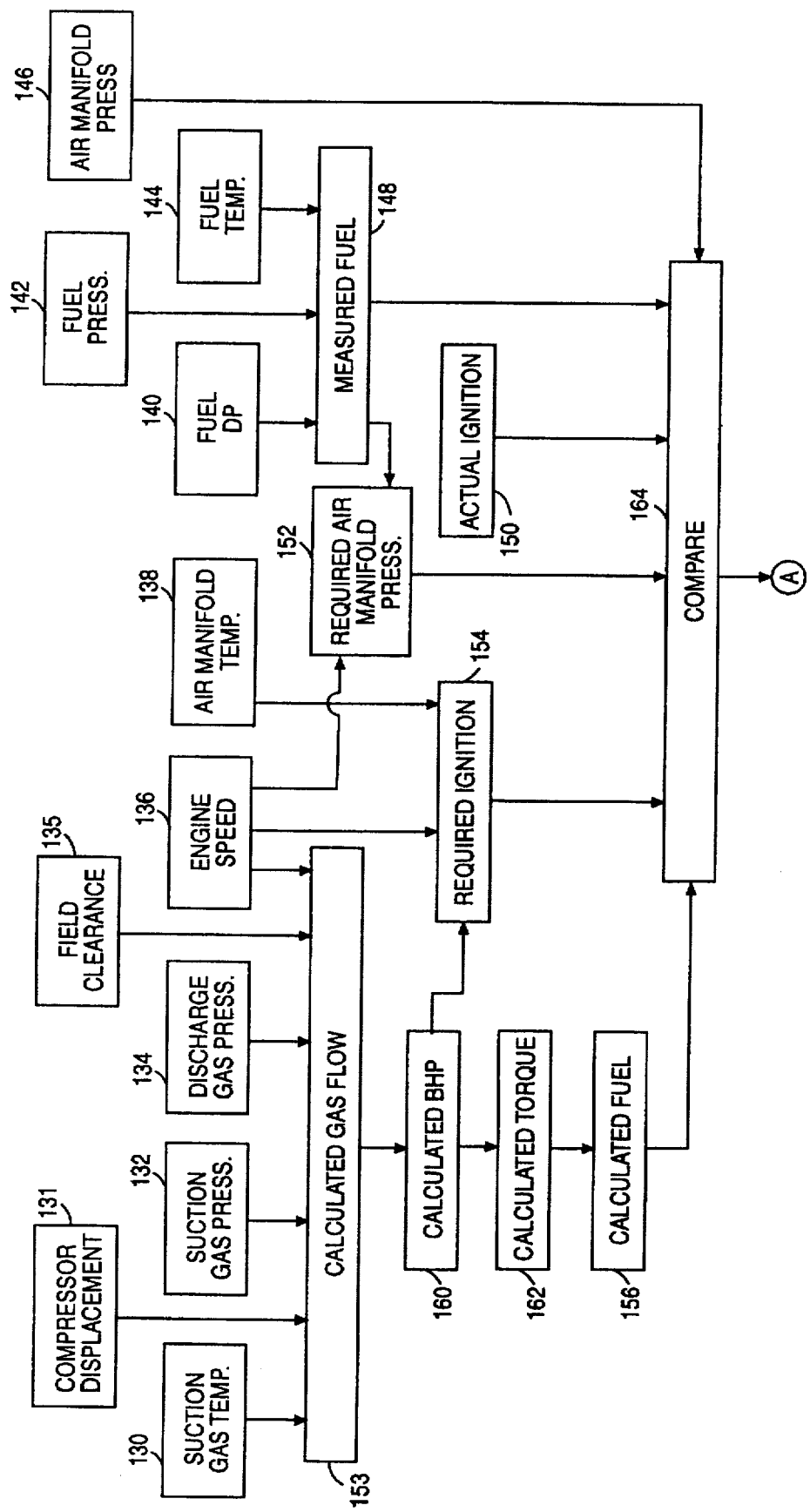
FIGS. 3A and 3B are flow chart diagram depicting, in further detail, a reciprocating engine embodiment of the method steps shown in FIG. 2.
Figure 3B:
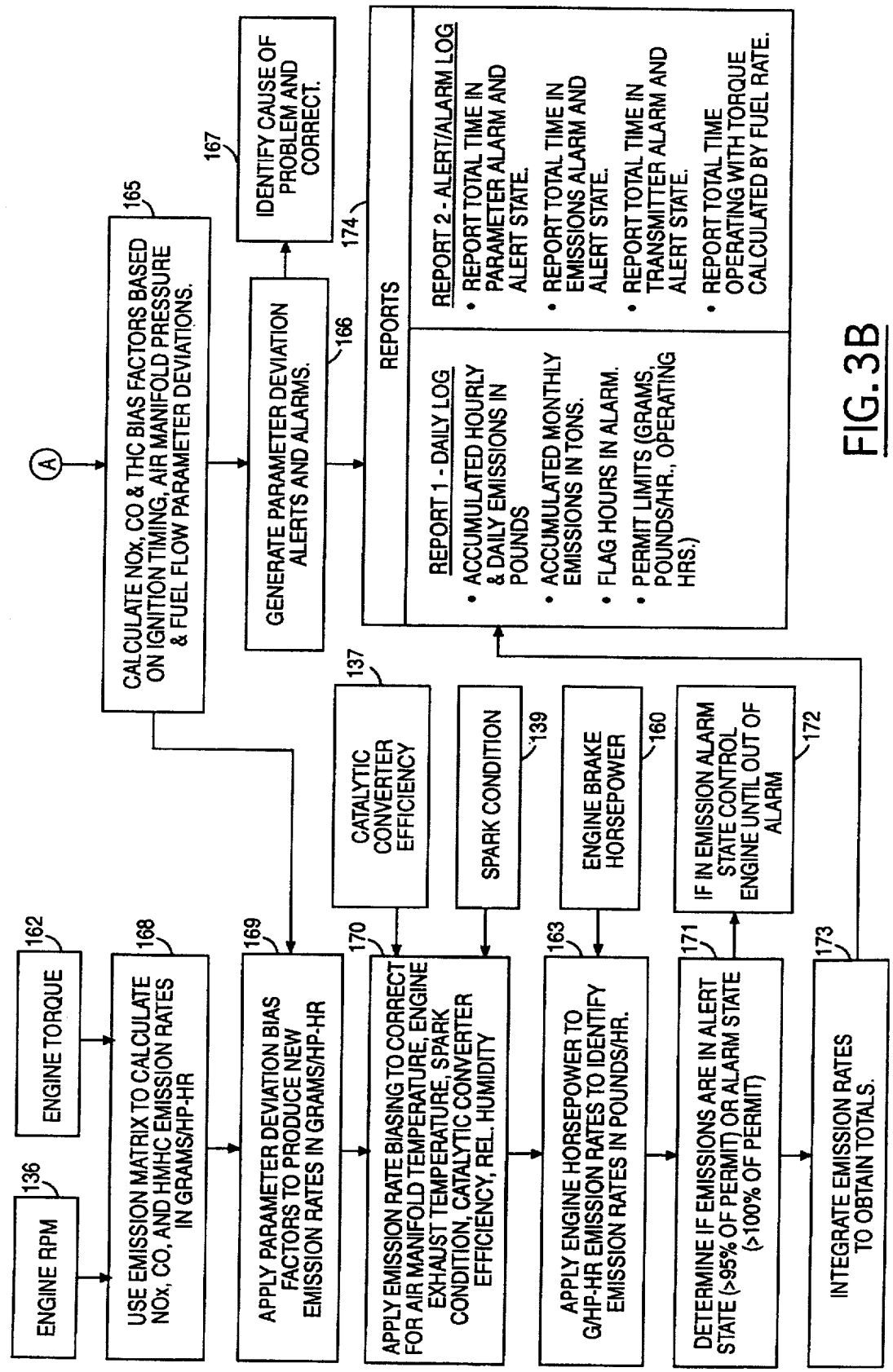

FIGS. 3A and 3B depict the flow chart of FIG. 2 in greater detail for a reciprocating engine embodiment (the preferred embodiment). The steps 130–146 correspond roughly to and show in greater detail the step of measuring the values of the set of process and unit operating parameters shown in FIG. 2 (step 110). Thus, for the reciprocating engine embodiment, the set of process and unit operating parameters comprise the suction gas temperature of the fluid in pipeline 16, the value of which is measured in step 130, compressor displacement of reciprocating compressor 24, the value of which is supplied in step 131, the suction gas pressure of the fluid in pipeline 16, the value of which is measured in step 132, the discharge gas pressure of the fluid in pipeline 16, the value of which is measured in step 134, the fixed clearance of reciprocating compressor 24, (a mechanical specification unique to compressor 24) the value of which is supplied in step 135, engine speed of engine 26, the value of which is measured in step 136, catalytic converter efficiency, the value of which is measured in step 137, air manifold temperature for engine 26, the value of which is measured in step 138, spark condition, the value of which is measured in step 139, fuel differential pressure (DP), the value of which is measured in step 140, fuel supply pressure, the value of which is measured in step 142, fuel supply temperature, the value of which is measured in step 144, and the air manifold pressure for engine 26, the value of which is measured in step 146. It should be appreciated that the station and engine processors 50 and 52 are making the above measurements via the respective sensor inputs under software control.

As discussed above, several of the process and unit operating parameters are detected with a plurality of sensors. The suction gas pressure and discharge gas header pressure parameters, measured in steps 132 and 134, respectively, are each measured with at least two sensors since these values are important in determining brake horsepower (BHP), torque, and other like parameters, which are in turn important in controlling the engine 26/pump compressor 24 unit, independent and apart from their importance in determining emissions. Accordingly, when the values detected by the redundant sensors for suction gas pressure and discharge gas pressure diverge by a predetermined amount, which may be 10%, process control of control system 14 internal to engine processor 52 switches the method by which it calculates, for example, BHP, from a method using measured operating parameters to a so-called fuel torque method using engine speed and fuel flow. The fuel torque method provides satisfactory results when engine 26 is tuned; however, if engine 26 is de-tuned, internally calculated BHP may diverge from actual developed BHP. To protect against this divergence, a fuel torque deviation alarm is signaled when the above-mentioned switch occurs. It should be appreciated that the prospect that actual emission levels will deviate from determined levels is prospective only since the engine was in "tune" immediately prior to the signaling of the fuel torque alarm, which alarm was based on a sensor abnormality, not an engine abnormality.

Moreover, the air manifold temperature, the air manifold pressure, and the fuel DP parameters are each measured with at least two, and preferably two, sensors since these parameters are important to an accurate emission level determination. Similar to the methodology employed with the suction gas and discharge gas pressure sensors, the dual input signals for each of the above parameters are monitored and a respective sensor alert or alarm signal is generated by PEMS 15 when a respective sensor deviation alert or alarm limit has been exceeded.

Further, PEMS 15 implements a unique sensor signal selection scheme when a specified deviation between dual parameter signals is detected. The underlying theory that unifies the selection guidelines to be described is that variation of each parameter affects the $NO_x$ emission level either up or down; the PEMS 15 selects either the lower or higher of the dual signals for each parameter so that the magnitude of the $NO_x$ emission level will be at its largest (i.e., worst case). Accordingly, for the air manifold pressure parameter, the PEMS 15 will select the lower of the input signals, for air temperature, the PEMS 15 will select the higher of the input signals, and for fuel DP, preferably high select.

As shown in FIG. 3A, steps 146, 148 and 150 roughly correspond to and show in greater detail the step of determining the values of the set of actual engine operating parameters shown in FIG. 2 (step 112). Thus, for the reciprocating engine embodiment of the present invention, the set of actual engine operating parameters comprises air manifold pressure, the value of which is measured in step 146, measured fuel rate (via fuel DP sensor 92), the value of which is determined in step 148 and actual spark ignition timing, the value of which is measured in step 150. It should be appreciated that the air manifold pressure measured in step 146 is related to an actual air to fuel ratio, an engine operating parameter discussed above as being an important factor in determining exhaust emissions of engine 26. It should be understood that the station and/or engine processors 50 and 52 are making the above determinations under software control.

The steps 152, 154 and 156 as shown in FIG. 3A roughly correspond to and show in greater detail the step of calculating the values of the set of expected engine operating parameters shown in FIG. 2 (step 114). Thus, in the reciprocating engine embodiment of the present invention, the set of expected engine operating parameters corresponds to the set of actual engine operating parameters, namely; required air manifold pressure, the value of which is calculated in step 152, the required spark ignition timing, the value of which is calculated in step 154, and a calculated fuel rate, the value of which is calculated in step 156. As noted above, it should be appreciated that the required air manifold pressure is indicative of and related to a required air to fuel ratio parameter, and that engine processor 52 performs the above determinations under software control. The required air manifold pressure is calculated in step 152 as follows. The PEMS 15 utilizes an air/fuel ratio matrix which provides a required air manifold pressure as a function of engine speed and either fuel flow or fuel header pressure, in units of inches of mercury (Hg). The data in this matrix is predetermined to correspond to the tuned operation of engine 26 and may be stored in engine RTU 52 for use by PEMS 15 and control system 14 to control engine 26. An exemplary air/fuel ratio table is found in Table 1.

TABLE 1

AIR/FUEL RATIO MATRIX
FUEL FLOW RATE (SCFH)

| % RPM | | | | | |
|---|---|---|---|---|---|
| 0.0 | 14,000 | 18,000 | 22,000 | 26,000 | 30,000 |
| 75.0 | 10.8 | 13.9 | 17.0 | 20.1 | 24.0 |
| 100.0 | 10.4 | 13.4 | 16.4 | 19.4 | 23.2 |

For example, for a fuel manifold pressure of 22,000 SCFH (standard cubic feet per hour) and 100% RPM, the required air manifold pressure is 16.4 inches of Hg. It should be understood that fuel header pressure, in p.s.i.g., may also be used in above matrix in place of fuel flow rate, by dividing fuel flow rate by one thousand. The determined required air manifold pressure provides a baseline figure for comparison, which is then biased relatively higher depending upon the measured air manifold temperature (step 138). These basic engine control methods are well known in the art and need not be discussed in any further detail.

The required spark ignition timing is calculated in step 154 as follows. The PEMS 15 utilizes an ignition timing matrix which provides the required ignition timing, preferably in degrees relative to top dead center (TDC), as a function of engine speed and calculated engine torque. Table 2 illustrates an exemplary ignition timing matrix.

TABLE 2

IGNITION TIMING MATRIX
% TORQUE

| % RPM | 30.0 | 70.0 | 80.0 | 90.0 | 104.0 |
|---|---|---|---|---|---|
| 75.0 | −8.0 | 3.0 | 9.0 | 9.0 | 8.0 |
| 100.0 | −8.0 | 3.0 | 11.5 | 11.5 | 10.5 |

As all degrees are relative to top dead center (TDC) negative values correspond to degrees after top dead center, while positive values refer to degrees before TDC (BTDC). For example, at 75% RPM and 70% torque, ignition timing is 3.0 degrees BTDC. The data in the ignition timing matrix is predetermined to correspond to the tuned operation of engine 26 and may be stored in engine RTU 52.

The calculated fuel rate is calculated in step 156 via intermediate calculations shown in steps 158, 160 and 162, which steps determine pipeline 16 gas flow, engine 26 brake horsepower, and torque, respectively. The calculated gas flow is determined in step 158 using the process and unit operating parameters in accordance with the following equation:

$$MMACFD = \frac{APD}{rev.} * EVs * RPM * \frac{1440 \text{ min}}{\text{day}} * \frac{1}{Z_s} * 10^{-6}$$

Where:

$MMACFD$ = Million actual cubic feet per day, $$\frac{APD}{rev.} \text{ (ft}^3\text{)} = \frac{\text{No. of active cylinders} * (2 * (\text{bore})^2 - (\text{rod diameter})^2) * \text{stroke} * \frac{\pi}{4}}{(12)^3}$$

bore, rod diameter, and stroke of the compressor are in inches, $EV_s$ = suction gas volumetric efficiency expressed as a fraction of a stroke, and whose magnitude is a function of compressor clearance and selected compressor load step, RPM=engine revolution per minute, and $Z_s$=suction gas compressibility factor whose magnitude is a function of suction gas temperature and suction gas pressure.

The calculated brake horsepower is determined in step 160 in accordance with the following equation:

total BHP=CHP+PHP+auxiliary loads

Where:

total BHP=total Brake Horsepower, $$CHP = \frac{[\text{Isentropic Horsepower } (IHP)/MMACFD + \text{Loss Brake Horsepower } (LHP)/MMACFD] * MMACFD}{em}$$

Where:

IHP is the power associated with an isentropic process, and the LHP term accounts for losses due to inefficiencies not considered in IHP, and $e_m$ is the mechanical efficiency, and is preferably equal to 0.95, PHP=Parasitic Horsepower is the power consumed by deactivation of a compressor cylinder end (in a double-acting compressor) or an entire cylinder or combination thereof, and auxiliary loads=loads placed on the engine/compressor unit, in the form of additional apparatus, that were not on the unit when tested at the factory.

The Isentropic Horsepower (IHP) is calculated in accordance with the following equation:

$$IHP = 3.031 * \frac{k}{k-1} * [(R_c)^{(k-1)/k} - 1] * \left[\frac{Zs + Zd}{2}\right] * [Ps + Patmos] * MMACFD$$

Where:

K=a constant, the ratio of specific heats of the gas, and approximately equal to 1.33, $R_c$=Compression ratio=$psia_{discharge}/psia_{suction}$, $Z_s$=Suction gas compressibility factor, whose magnitude is a function of suction gas temperature and suction gas pressure, $Z_d$=discharge gas compressibility factor, whose magnitude is a function of discharge gas temperature and pressure, and $P_s$=suction gas pressure in psia Patmos=atmospheric pressure, which varies depending on site elevation.

The Loss Brake Horsepower (LHP) is calculated in accordance with the following equation:

$$LHP = \left[\frac{VLC * RPM^2 * SG}{(Ts + 460)} * \frac{(Ps + Patmos)}{14.4}\right] * MMACFD$$

Where:

VLC=Valve Loss Constant,

RPM=engine speed in revolutions per minute,

SG=gas specific gravity, preferably equal to 0.6, $T_s$=suction gas temperature (°F), $P_s$=suction gas pressure (psia), and This formula has been developed by the assignee of this invention over a period of 15 years and extensive work has been done to correlate the calculated brake horsepower to the actual brake horsepower; accuracies to ±3% are standard.

Torque can be described as the relative load carried by an engine/compressor pump unit with regard to its operating speed. The calculated torque is determined in step 162 in accordance with the following equation:

$$\% \text{ Calculated Torque} = \frac{\text{Calculated BHP}}{\text{Rated BHP}} * \frac{\text{Rated RPM}}{\text{Actual RPM}} * 100$$

After steps 158, 160, and 162 have been performed, the calculated fuel rate is determined in step 156 in accordance with the following equation:

$$\text{Calculated Fuel Rate} = GHR * \frac{GHRR * BHP}{BTU}$$

Where:

GHR=the unit guaranteed heat rate (derived by test and compared to manufacturer published value for relative agreement), GHRR=a guaranteed heat rate ratio number as a function of engine speed and torque, Calculated BHP=the brake horsepower as calculated in step 160, and BTU=the low dry heating value of gas in British Thermal Units.

The guaranteed heat rate ratio (GHRR), which is a function of engine speed and torque, is provided for use by PEMS 15 in calculating the fuel rate in step 156 from an efficiency matrix, an exemplary efficiency matrix being found in Table 3.

TABLE 3

| | EFFICIENCY MATRIX (RECIPROCATING) | | | |
|---|---|---|---|---|
| | % TORQUE | | | |
| % RPM | 55.0 | 70.0 | 85.0 | 100.0 |
| 75.0 | 1.45 | 1.18 | 1.073 | 1.04 |
| 85.0 | 1.44 | 1.107 | 1.036 | 1.022 |
| 100.0 | 1.42 | 1.08 | 1.015 | 1.0 |

For example, at 85% of maximum rated RPM and 70% of maximum rated torque, the GHRR=1.107. The efficiency matrix is compiled from predetermined tuned and balanced engine operating data and is described in further detail below.

In step 164, as shown in FIG. 3A, the actual engine operating parameter values are compared with the expected engine operating parameter values for the reciprocating engine embodiment wherein several comparisons and calculations are performed to determine whether engine 26 is operating within the control envelope. First, the calculated fuel rate as determined in step 156, is compared with the measured fuel rate as determined in step 148, in accordance with the following equation to yield an engine efficiency:

$$\text{Efficiency} = \frac{\text{Calculated Fuel Rate}}{\text{Actual Fuel Rate}} * 100$$

Further, the required ignition timing as determined in step 154 is compared with the actual ignition timing as measured in step 150 and the required air manifold pressure as determined in step 152 is compared against the actual air manifold pressure as measured in step 146.

Comparison step 164, which may be performed by engine processor 52 under software control, is an important step in the present invention since the underlying parameters are indicative of the engine's operating condition, and thus emissions, are verified prior to determining the level of emission products. Depending on the results of the comparisons, a parameter deviation alert/alarm may be generated. In any event, an emissions value for $NO_x$, CO and THC will be determined.

Alert/Alarms

The Parametric Emissions Monitoring System 15 is a robust system capable of verifying when the output (i.e., emissions levels) is accurate as initially determined and when, due to internally detected abnormalities, the output should be adjusted due to the nature of the detected abnormality. As discussed above, PEMS 15 provides a two level system of informing an operator of station 10, or the centralized data acquisition system 46, that predefined abnormalities that have an impact on emissions have been detected. The first level is an alert level, wherein slight deviations not rising to a level serious enough to warrant specific action have been detected. A second, more serious level, is an alarm level, which indicates that a higher than desired divergence condition exists. The PEMS 15 provides for four types of alerts/alarms: (1) fuel torque alert/alarms, (2) parameter deviation alerts/alarms, (3) sensor deviation alerts/alarms, and (4) emissions alerts/alarms.

The first type of alerts/alarms, fuel torque alert/alarm discussed above, arises due to deviations in the output of suction gas header pressure and/or discharge gas header pressure sensors 60 and 56 respectively. The second type of alerts/alarms, parameter deviation alerts/alarms, may include three types of alerts/alarms: (1) an efficiency alert/alarm, (2) a spark ignition timing alert/alarm, and (3) an air manifold pressure alert/alarm. These parameter alert/alarms arise as a result of the comparison as shown in step 164 of FIG. 3A. For example, an efficiency variation of ±5%, an ignition timing variation of ±1 degree, and an air manifold pressure deviation of ±0.5 inches Hg will cause a respective parameter deviation alert to issue from PEMS 15. These levels define parameter alert limits. Moreover, by way of illustration, an efficiency deviation of ±10%, an ignition timing deviation of ±2 degrees, and an air manifold pressure deviation of ±1 inches Hg will cause a respective parameter deviation alarm to be generated by PEMS 15. These levels define parameter alarm limits. Further, it should be understood that these levels are exemplary only and may not be optimal for all reciprocating engine installations. Moreover, other engine systems may use different thresholds.

The third type of alerts/alarms arise from deviations from the redundant sensor configurations for detecting the fuel differential pressure, air manifold pressure, and air manifold temperature. As with the other types of alerts/alarms, a first level deviation causes an alert to be generated, while deviation beyond a second, higher level limit will cause an alarm to be generated. In any event, the PEMS 15 will select the one signal that will result in the worst case emission rate (see above).

The fourth type of alerts/alarms arise from the determination that a total amount of emissions product over a specified time interval has been exceeded. A first level deviation causes an alert to be generated, while deviation beyond a second, higher level limit will cause an alarm to be generated. To illustrate, a particular jurisdiction may set a permit limit rate for lbs CO/hour. An alert may be generated when a first percentage of the permit rate amount is reached. When a second percentage of the permit value is reached, an alarm may be generated. Moreover, engine 26 may exhaust, for transitory periods, specified pollutants at excessive rates. The PEMS 15 provides the flexibility to customize the duration of the "window" in which these transients are tolerated. For example, transients in engine exhaust lasting less than x minutes will not generate an alarm; however, when the excessive rate of pollutant exhaust extends beyond x minutes, an emissions alarm will be issued by PEMS 15. The value of x is selectable, for example, based on the standard in the jurisdiction.

In light of the foregoing, and referring to FIG. 3B, in step 165, the results of the comparisons of the fuel rate, spark ignition timing, and air manifold pressure are checked, for example, by engine processor 52 under software control. The parameter deviations (i.e., deviation of the actual ignition timing from the required ignition timing) are used by PEMS 15 to calculate bias factors for each emission product parameters, including $NO_x$, CO, and THC. The parameter deviations are further checked against respective ALERT and ALARM limits. If the respective parameters are not within limits, the method of the present invention branches to step 166, where a parameter deviation alert or alarm is generated, and then to step 167, where the cause of the problem giving rise to the parameter alert/alarm is identified and corrected by facility personnel.

However, regardless of whether the parameter deviations are of such magnitude as to give rise to a parameter deviation alert/alarm, the present invention will nonetheless accurately determine the emissions levels for each emission product parameter. Accordingly, the method, in step 168, uses engine torque and engine speed to calculate the emission products parameter values (e.g., $NO_x$, CO, and THC emission rates) using the emissions matrix. Thus, in the reciprocating engine embodiment, the parameters in the set of emission product parameters includes $NO_x$, CO and total hydrocarbons (THC). Some jurisdictions require that subsets of THC be determined; for example, either VOCs or NMHC can be extracted from the THC emissions level. To further illustrate, the NMHC levels are approximately 8% of the THC level in the reciprocating engine embodiment. It should be appreciated from FIG. 3B, that step 168 and 165 occur logically in parallel. The method proceeds in step 169, where the bias factors are applied to the respective emission rates determined in step 168 to produce a modified set of modified emission product parameter values. It should be appreciated that the emission rates generated in step 169 are a function of the bias factors generated in step 165, which are in turn a function of the magnitude and polarity (positive or negative) of the parameter deviation. Thus, the emission rates produced in step 169 vary continuously in accordance with the parameter deviations; the signaling of an alert/alarm by PEMS 15 does not affect the calculation performed in step 169.

In step 170, the modified emission rate values for each pollutant (from step 169) are biased either upward or downward, preferably as a function of respective air manifold temperature, spark condition, relative humidity, exhaust temperature standard deviation and optionally, catalytic converter efficiency, bias factors.

In step 163, calculated engine brake horsepower is applied to gram/bhp-hr emission rate (where applicable) to identify emission rates in pounds/hr.

In step 171, PEMS 15 determines whether the emissions rates from step 163 exceed an emissions alert or an emissions alarm level. In this preferred embodiment, a state regulatory agency may set a permit level in issuing a permit to enable station 10 to operate. When the emissions rates exceed 95% of the maximum allowed by the permit, an emissions alert is generated; likewise, an emissions alarm is generated when 100% of the permit value is exceeded.

In step 172, if the system is in an emission alarm state, engine 25 is controlled until the emissions are out of the alarm state.

In step 173, the emissions rates determined in step 170 are integrated to obtain a total level for the integration period.

In step 174, reports are generated detailing the emission amounts for a preselected period (e.g., an hour, or a day) for each pollutant. Further any alerts/alarms generated are also compiled and output in the report generated in step 174. For example, report 1, the daily log, may include accumulated hourly and daily emissions in pounds, accumulated monthly emissions in tons, "flagging" or "tagging" the hours the system operated in an alarm state, and the relevant permit limits (grams, pounds per hour, operating hours). Further, report 2, the alert/alarm log, may include a report indicating the total time in parameter alarm and alert states, a report indicating the total time in emissions alarm and alert states, a report indicating the total time in transducer or sensor alarm and alert states, and a report indicating the total time operating in fuel torque alarm and alert states.

Emissions Matrix

The above-mentioned emissions matrix is the starting point for determining emission levels as illustrated in step 168 of FIG. 3B. Table 4 shows an exemplary emissions matrix for $NO_x$ that provides an output as a function of engine speed and torque.

TABLE 4

EMISSIONS MATRIX-RECIPROCATING
% TORQUE

| | $NO_x$ Constant = 10.35 | | | |
|---|---|---|---|---|
| % RPM | 70 | 80 | 90 | 100 |
| 70 | 1.11 | 1.04 | 1.01 | .96 |
| 80 | 1.12 | 1.05 | 1.02 | .98 |
| 90 | 1.15 | 1.05 | 1.03 | .99 |
| 100 | 1.15 | 1.07 | 1.03 | 1 |

The PEMS 15 preferably includes three separate matrices, one for each pollutant: $NO_x$, CO or THC (see exemplary $NO_x$ table above). Every point in each matrix is associated with a preselected multiplier, which is then multiplied by a respective $NO_x$, CO or THC constant. The constant is the rate in gr/BHP-Hr. at 100% speed and 100% torque. The multiplier at 100% speed and 100% torque is thus always 1. As torque and/or engine speed are varied, the emissions rate increases or decreases as shown by the multiplier in the matrix going to a number greater than or less than 1. Example: $NO_x$ constant=10.35 gr/BHP-Hr. and engine is running at 90% speed and 100% torque. The emissions rate is 10.35×1.03=10.66 gr/BHP-Hr. The process involved in defining this emissions matrix is critical to assure accuracy and repeatability. First, engine 26 is tuned and balanced for its required air/fuel ratio control and ignition timing at all speed and torque ranges. Note that this is where the above mentioned air/fuel ratio and ignition timing matrices are defined. Second, the heat rate and emission rate for each of the concernable emission parameters are measured at 100% speed and 100% torque. This measured value defines the guaranteed heat rate for the unit. From this point, engine speed and torque are varied while monitoring the heat rate and emissions rate at each of these varied points. The emissions information is compiled to define the emissions matrix. Further, the above-mentioned efficiency matrix is defined by using the compilation of the measured heat rates at each torque and speed point. The efficiency matrix is a matrix that provides a guaranteed heat rate ratio (GHRR) value (as an output) as a function of engine speed and torque. Each point in the efficiency matrix is defined in accordance with the following equation:

$$GHRR = \frac{GRmeasured}{GHR_{rated}}$$

Where:

GHRR=Guaranteed heat rate ratio, $GHR_{measured}$=Guaranteed heat rate as measured for an engine speed and torque set point, and $GHR_{rated}$=Guaranteed heat rate, as rated for the predefined set point of 100% speed and 100% torque. the measured value is compared to the manufacturer published value to assure that the unit is operating in the general range of expectation.

Thus, a baseline emissions rate is provided by the emissions matrix as a function of engine speed and torque. However, engine operating parameter deviations due to engine detuning and other degradations affect the actual emissions of engine 26. Accordingly, as illustrated in step 165, emission product bias factors based on parameter deviations are calculated. These bias factors are determined as follows. Each engine operating parameter is, in turn, manually varied until a plus/minus 10% (alert level) and plus/minus 20% (alarm level) from the envelope baseline emission level for any of the concernable emissions products results, then, the corresponding values for the remaining emissions products will be documented. Thus, in the preferred embodiment of the present invention, air manifold pressure will be manually overridden (while maintaining engine speed, engine torque and air manifold temperature constant) and all emission product levels will be monitored. The air manifold pressure value which results in an alert level and an alarm level deviation from the respective baseline emissions level for any of the emission products represents the reference point at which the corresponding emission product levels are recorded. This procedure is repeated for ignition timing (while maintaining engine speed and torque constant) and for fuel flow or fuel consumption (i.e., by changing engine torque while maintaining engine speed and air manifold temperature constant). Once these levels have been determined, PEMS 15 may calculate respective bias factors for $NO_x$, CO and THC via any well known interpolation methodology (i.e., linear interpolation, quadratic curve fit, etc.).

Figure 4:
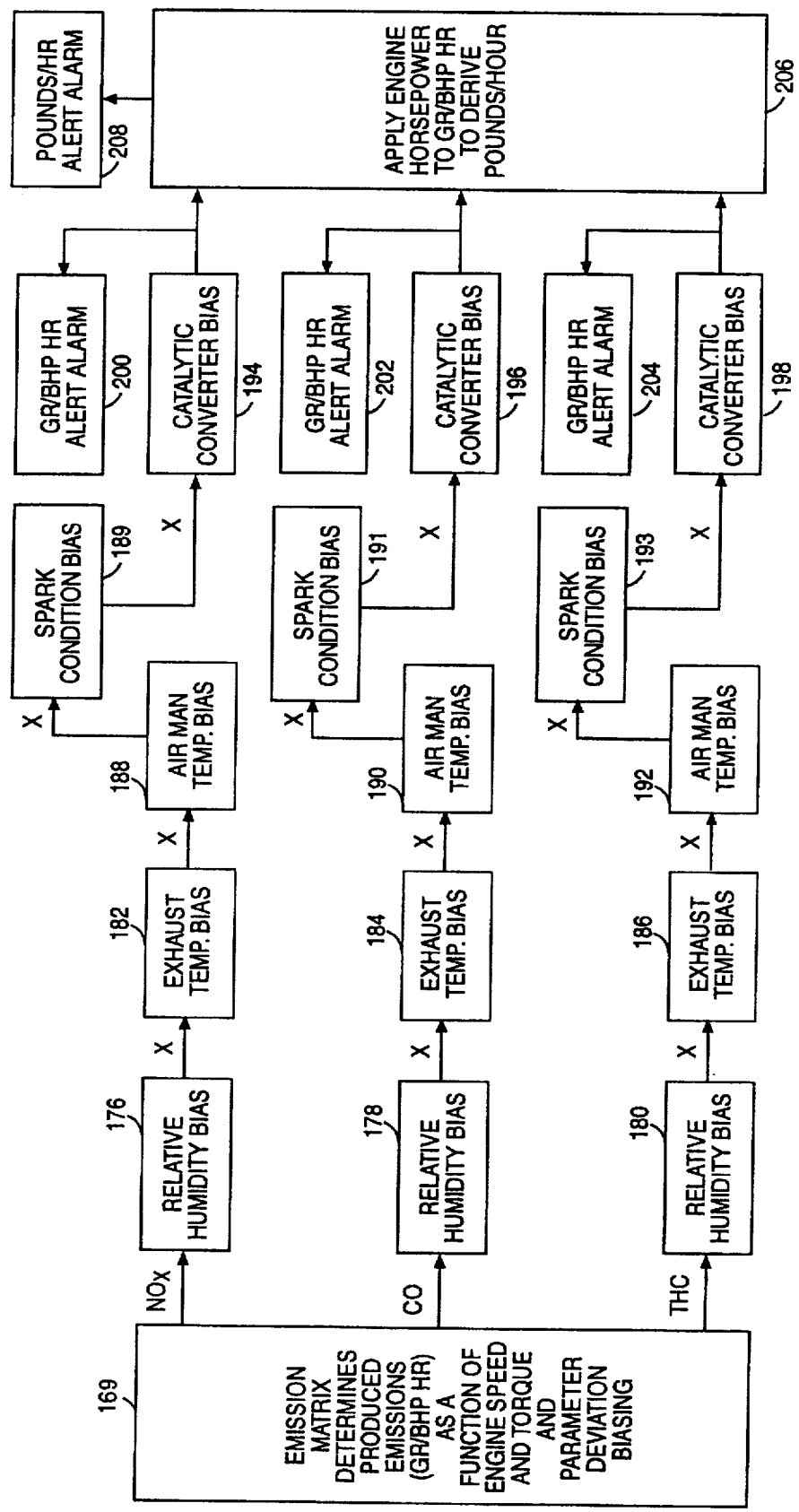
FIG. 4 is a block diagram view depicting, in further detail, the step of determining reciprocating emissions shown in FIG. 3, including the biasing of an emissions matrix output, and generating a report.

Moreover, certain ambient factors further affect the actual emissions of engine 26 and whose value may differ during engine 26 operation from the value of the respective ambient factor that was observed when the emissions matrix was generated. This difference may have the effect of skewing the determined emission level relative to the levels actually produced by engine 26. Accordingly, PEMS 15 enters and performs a second biasing phase (in addition to parameter deviation biasing—step 169) after the baseline emissions rate has been determined from the emissions matrix. This biasing phase is illustrated in FIG. 4 and represents step 170 of FIG. 3 in greater detail. Step 169 depicts the output of the emissions matrix as a function of engine speed and torque as shown in steps 168 and 169 of FIG. 3. In the reciprocating engine embodiment, four emissions biasing parameters are defined: station relative humidity, power cylinder exhaust temperature standard deviation, spark condition, and air manifold temperature. Optionally, a fifth parameter, catalytic converter efficiency, may be defined in those engine/compressor units utilizing a catalytic converter in the exhaust stack.

The relative humidity at each station has a predetermined effect on the respective emission matrix output and thus, a predetermined biasing factor is employed. These bias factors are identified and documented using engineering data and published literature, and are thus well known in the art.

Power cylinder exhaust temperature deviations are an indication of how well the engine load is being distributed between the plurality of cylinders in engine 26 and thus may be used to gauge engine wellness. As engine 26 becomes unbalanced, on a per cylinder basis, the total exhaust emissions are likely to deviate from the parametric emissions matrix. To compensate for this deviation, the respective emission matrix output will be continuously biased by a predetermined amount (i.e., a bias factor) using a statistical analysis method (such as cylinder exhaust temperature standard deviation). Moreover, the bias factors are determined by varying cylinder balance (as reflected by the selected statistical analysis method) at the normal operating load while simultaneously monitoring emissions. Based on the results, the bias factors will be defined.

Spark condition deviations are an indication of how well individual cylinders ignite the air/fuel mixture due to the capability of the spark plugs. Therefore, spark condition directly describes how well the engine load is being distributed between the plurality of cylinders in engine 25 and thus may be used to gauge engine wellness. As engine 26 becomes unbalanced, on a per cylinder basis, the total exhaust emissions are likely to deviate from the parametric emissions matrix. To compensate for this deviation the respective emission matrix output will be continuously biased by a predetermined amount (i.e., a bias factor) using a statistical analysis method (such as standard deviation of peak voltage, magnitude or duration, which occurs at each spark plug). Moreover, the bias factors are determined by varying cylinder balance (as reflected by the selected statistical analysis method) at the normal operating load while simultaneously monitoring emissions. Based on the results, the bias factors will be defined.

The effect of air manifold temperature (AMT) on emissions levels is due, in part, to the effect AMT has on the combustion temperature; a higher AMT causes higher combustion temperatures, and with concomitant effect on emissions, as described above. These bias levels are preferably determined by varying the AMT to a maximum and minimum value, wherein the resulting emissions levels define the value of the bias factors. Finally, for those stations employing a catalytic converter, an additional bias factor will be recognized and is operable to scale the respective emissions matrix output according to a catalytic converter efficiency parameter detected via sensor 72.

As shown in FIG. 4, steps 176, 178 and 180 bias the respective emission matrix outputs $NO_x$, CO and THC by a respective station relative humidity bias factor derived as a function of relative humidity as detected by sensor 68 and read by station processor 50. In steps 182, 184 and 186 the respective emissions matrix outputs are biased by a respective exhaust temperature bias factor derived as a function of the cylinder temperature deviation as detected by sensors 76 and read by engine processor 52.

In steps 188, 190 and 192, the respective emissions matrix outputs are biased by a respective air manifold temperature bias factor derived as a function of the air manifold temperature detected by sensor 84 and read by engine processor 52. In steps 189, 191, and 193, the respective emissions matrix outputs are biased by a respective spark condition bias factor derived as a function of the measured spark condition signal generated by spark condition monitor 55 using the signals detected by sensors 59. It should be appreciated that, unlike air manifold temperature and relative humidity, which affect emissions regardless of whether the engine is operating in tune, the spark condition signal (and thus too the spark condition bias factor), changes value as the health of the engine changes. Accordingly, use of such a biasing factor is new and useful and may be advantageously employed with prior art emissions monitoring systems that do not employ incorporate the inventive method and apparatus as herein described.

In steps 194, 196 and 198, the respective emissions matrix outputs are (optionally) biased by a respective catalytic converter bias factor derived as a function of the catalytic converter efficiency detected by sensor 72 and read by engine processor 52 through line 74. The converter bias is used only in systems incorporating a catalytic converter in the exhaust.

The PEMS 15 further has the capability to selectively issue an alert and/or an alarm when an emission level for $NO_x$, CO, or THC violates a selected set point, or state permit limit as shown in alert/alarm boxes 200, 202, and 204.

It should be appreciated that the frequency with which the set of process and unit operating parameters are measured and with which the method steps of the present invention are performed define a time period in which emissions for each of the emission product parameters may be accumulated at the rate defined by the emissions matrix and varied by the above-described "biasing" (parameter deviation and emissions). Thus, after the baseline emissions rates have been determined and biased, an updated emissions amount for each concernable emission parameter is calculated as the product of the emissions rate and the time period (i.e., the period of time until the respective emission rates are redefined by again performing the method of the present invention). This updated emissions amount can be accumulated for a plurality of periods to define a total emissions amount for each pollutant for a predefined time interval. This accumulation corresponds to the integrating step, shown as step 173 of FIG. 3B. Thus, in step 206, a report may be generated that provides information regarding the emissions rate, as well as the total amount of exhausted emissions product for any time interval (e.g., 24 hours, month, etc.). Similarly, an alert/alarm may be generated if the emissions rate for any of the emissions products exceeds a selected set point, as in step 208.

As shown in FIG. 5A, an emissions report 210 is depicted representing the report generated in step 174 of FIG. 3B and steps 206 and 208 of FIG. 4, which, includes a 24 hour cumulative report 212, and a monthly report 214 to show an exemplary report format. Report 212 indicates the total pounds of THC, CO, and $NO_x$ for the previous 24 hour period on a per engine basis, while monthly report 214 provides similar information for the previous month. Also shown in FIG. 5B is an emission alarm report 216 which may provide information such as the number of pounds emitted while an engine is in alarm.

Turbine Engine Embodiment

Figure 6:
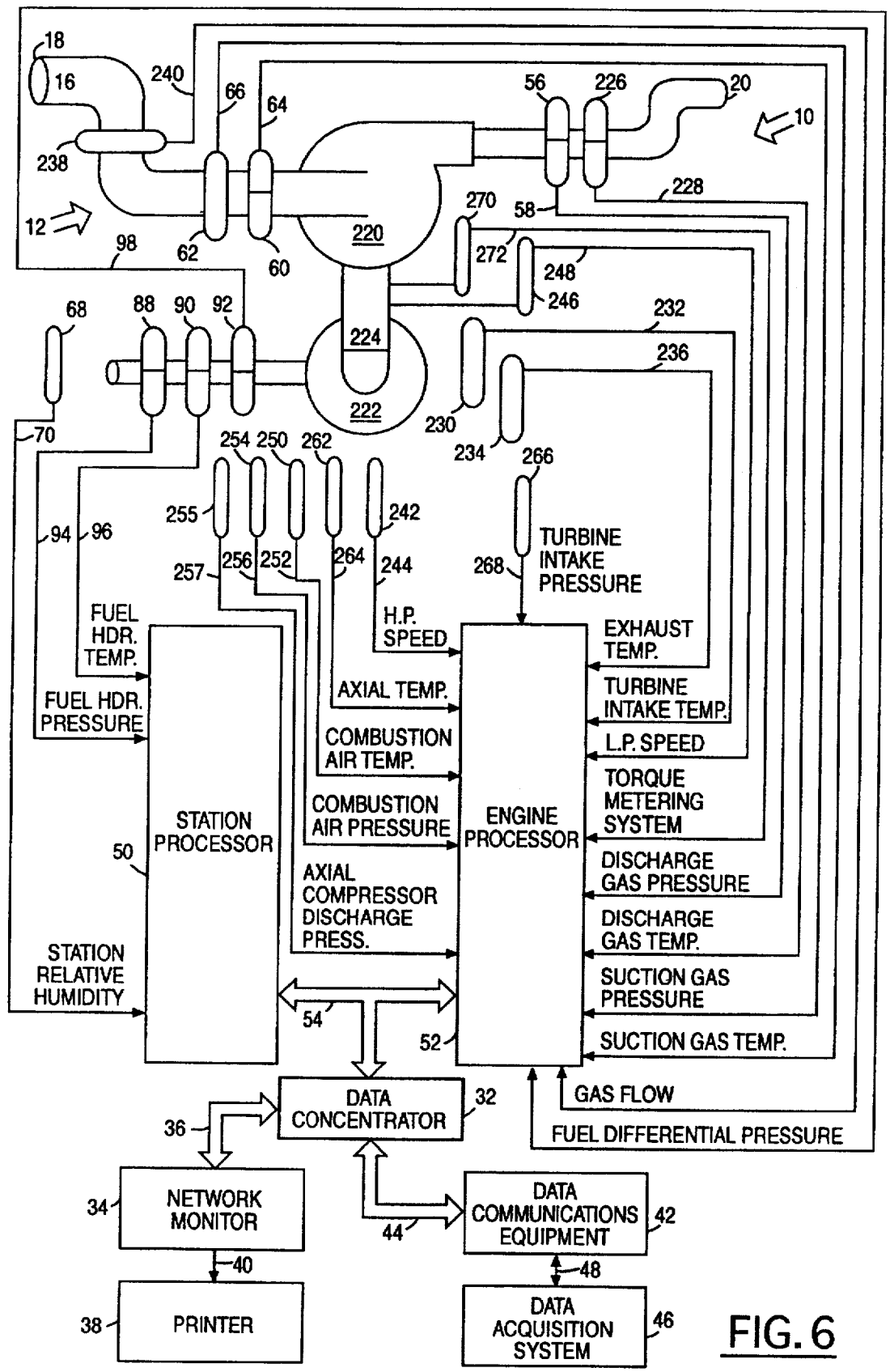
FIG. 6 is a combined block and diagrammatic view of a second embodiment in accordance with the present invention for monitoring the emissions of a stationary turbine engine.

As shown in FIG. 6, a second embodiment of the present invention includes a centrifugal compressor 220 and turbine engine 222 unit. Turbine engine 222 drives compressor 220 via linkage 224. Although similar in many respects to the preferred reciprocating embodiment, this embodiment utilizes different parameters for purposes of control, and, more importantly, for purposes of calculating emissions. The turbine embodiment includes the following sensors connected to engine processor 52: a discharge gas temperature sensor 226 via line 228, turbine intake air temperature sensor 230 via line 232, exhaust temperature sensor 234 via line 236, Gas flow DP sensor 238 via line 240, High-Pressure (H.P.) speed (Turbine Engine Speed) sensor 242 via line 244, Low-Pressure (L.P.) speed (Gas Compressor Speed) sensor 246 via line 248, combustion air temperature sensor 250 via line 252, combustion air pressure sensor 254 via line 256, axial compressor discharge pressure sensor 255 via line 257, an axial compressor air temperature sensor 262 via line 264, turbine intake air pressure sensor 266 via line 268, and torque sensor 270 via line 272 (optional).

The turbine embodiment is characterized by a relatively greater sensitivity to changes in fluid temperature and pressure changes in pipeline 16 than the reciprocating embodiment. Accordingly, discharge gas pressure sensor 56 is connected to engine processor 52 via line 58, suction gas pressure sensor 60 is connected to engine processor 52 via line 64, suction gas temperature sensor 62 is connected to engine processor 52 via line 66, and the discharge gas temperature sensor 226 is connected to engine processor 52 via line 228. Providing a unique set of sensors for each engine rather than one set of sensors for a plurality of engines, allows for a local, and thus more accurate, determination of the suction gas temperature and pressure and the discharge gas temperature and pressure.

Figure 7A:
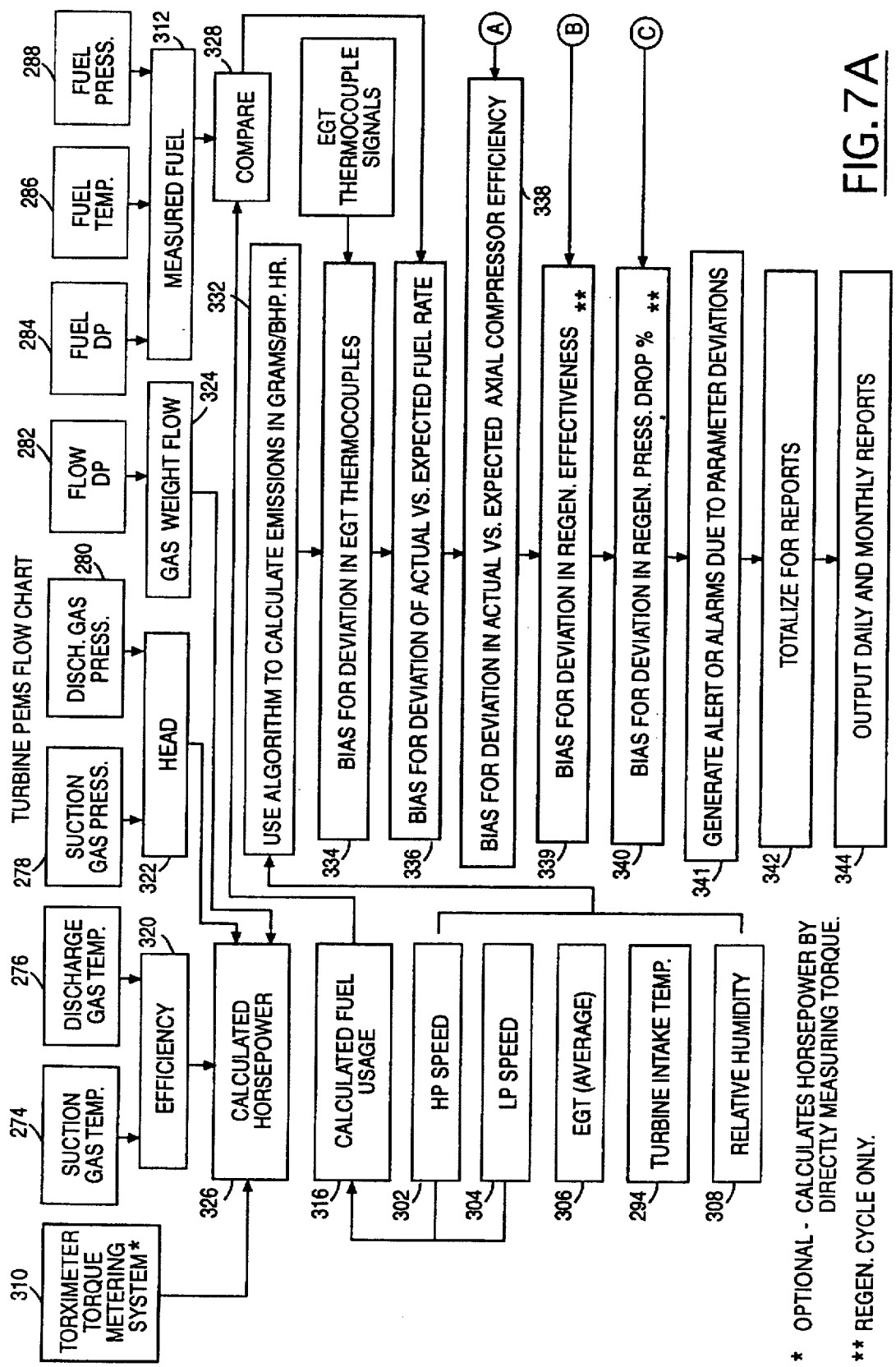
FIGS. 7A and 7B are flow chart diagrams depicting, in further detail, a turbine engine embodiment of the method steps shown in FIG. 2.
Figure 7B:
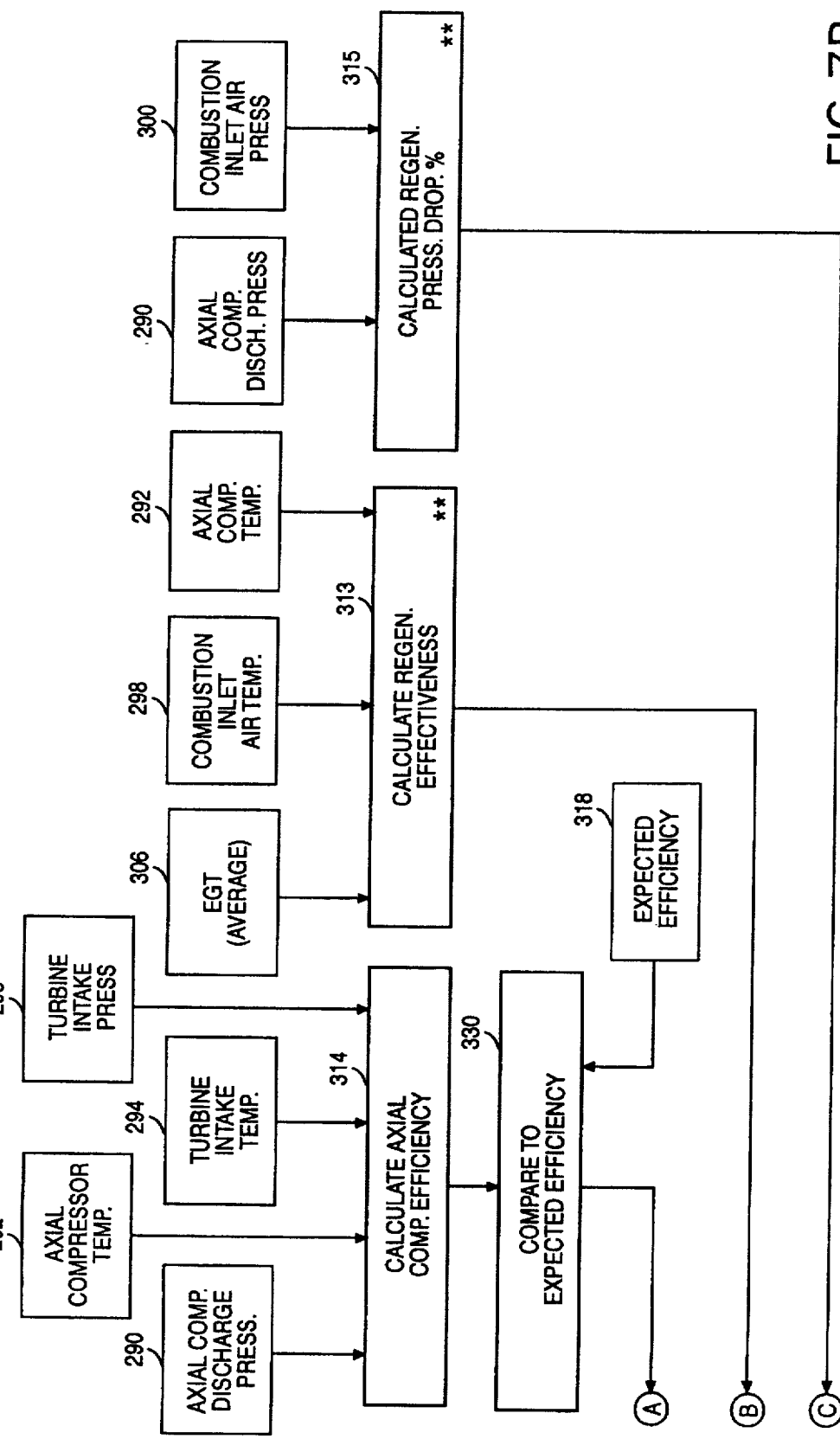

Referring to FIGS. 7A and 7B, steps 274-310 roughly correspond to and show in greater detail, the step of measuring the values of the set of process and unit operating parameters shown in FIG. 2 (step 110). Thus, for the turbine embodiment of the present invention, the set of process and unit operating parameters comprises suction gas temperature, the value of which is measured in step 274, discharge gas temperature of the fluid in pipeline 16, the value of which is measured in step 276, suction gas pressure of the fluid in pipeline 16, the value of which is measured in step 278, discharge gas pressure of the fluid in pipeline 16, the value of which is measured in step 280, gas fluid flow (flow DP) in pipeline 16, the value of which is measured in step 282, fuel differential pressure (DP) the value of which is measured in step 284, fuel header temperature, the value of which is measured in step 286, fuel header pressure, the value of which is measured in step 288, axial compressor discharge pressure, the value of which is measured in step 290, axial compressor air temperature, the value of which is measured in step 292, turbine intake air or ambient temperature, the value of which is measured in step 294, turbine intake air or ambient pressure, the value of which is measured in step 296, combustion air temperature, the value of which is measured in step 298, combustion air pressure, the value of which is measured in step 300, HP (High Pressure) Speed (turbine engine speed), the value of which is measured in step 302, LP (low pressure) Speed (Gas Compressor Speed), the value of which is measured in step 304, turbine engine exhaust temperature, the value of which is measured in step 306, relative humidity, the value of which is measured in step 308, and an optional direct torque measurement, the value of which is measured in step 310. This optional torque measurement takes the place of measurement steps 274-282, and calculations required to determine horsepower.

Steps 312-315 roughly correspond to and show in greater detail, the step of determining the values of the set of actual engine operating parameters shown in FIG. 2 (step 112). Thus, for the turbine embodiment of the present invention, the set of actual engine operating parameters includes a measured fuel rate, the value of which is determined in step 312 via conventional manner from the fuel rate information from steps 284-288, a calculated Regenerator Thermal Effectiveness, the value of which is determined in step 313 using the data obtained in steps 306, 298, and 292 a calculated axial compressor efficiency, the value of which is determined in step 314, and a Regenerator Pressure Drop (in %), the value of which is determined in step 315 using the data obtained in steps 300 and 305.

The Formula for Regen Effectiveness is calculated in step 313 as follows:

$$\text{Regen Effect.} = \frac{CIT - TCD}{EGT - TCD}$$

Where:

CIT=Combustion Inlet Air Temperature in degrees Rankine (measured in step 298)

TCD=Axial Compressor Discharge Air Temperature in degrees Rankine (measured in step 292), and EGT=Average Exhaust Gas Temperature in degrees Rankine (measured in step 306).

The axial compressor efficiency is determined in step 314 in accordance with the following equation:

$$\text{Efficiency} = Ti \frac{\left[\left[\frac{P_o}{P_i}\right]^{\frac{k-1}{k}} - 1\right]}{T_o - T_i}$$

Where

K=1.4 for air $T_i$=Turbine Intake Temperature in Rankine $T_o$=Axial Compressor Discharge Temperature in Rankine $P_i$=Turbine Intake Pressure in psia $P_n$=Axial Compressor Discharge Pressure in psia The Formula for Regen Pressure Drop % is calculated in step 315 as follows:

$$\text{Regen Press. Drop \%} = \frac{PCD - CIP}{PCD + AMP}$$

Where:

PCD=Axial Compressor Discharge Pressure in psia (measured in step 305),

COP=Combustion Inlet Air Pressure in psia, and (measured in step 300)

AMP=Ambient Pressure in psia.

Steps 316 and 318 roughly correspond to and show in greater detail the step of calculating the values of a set of expected engine operating parameters shown in FIG. 2 (step 114). Thus in the turbine embodiment, the set of expected engine operating parameters includes a calculated fuel rate, the value of which is determined in step 316 and in a manner (i.e., via an emissions matrix) which is identical to the reciprocating engine embodiment above-described except that HP speed 302, LP speed 304, and horsepower 326 are used as inputs, and an expected axial compressor efficiency, a preselected constant based on the turbine characteristics, the value of which is selected in step 318. Further, for the turbine embodiment, the set of expected engine operating parameters further includes Regenerator Thermal Effectiveness, the value of which is preselected (step not illustrated), and Regenerator Pressure Drop, the value of which is preselected (step not illustrated). The calculated fuel rate determined in step 316, however, requires intermediate calculations as shown in steps 320, 322, 324, and 326 that differ from the reciprocating embodiment.

In step 320, the adiabatic efficiency is determined according to the following formula:

$$\eta_a = T_s * \frac{\left[\left[\frac{Pd}{Ps}\right]^{\frac{k-1}{k}} - 1\right]}{(Td - Ts)}$$

$\eta_a$=adiabatic efficiency, $T_s$=suction gas temperature, in degrees Rankine, $P_d$=discharge gas pressure in psia, $P_s$=suction gas pressure in psia, k=a constant preferably approximately 1.30, for natural gas, and $T_d$=discharge gas temperature, in degrees Rankine In step 322, the adiabatic head is determined according to the following formula:

$$h_a = \left[\frac{Zs + Zd}{z}\right] * R * T_s * \left[\frac{k}{k-1}\right] * \left[\left[\frac{Pd}{Ps}\right]^{\frac{k-1}{k}} - 1\right]$$

H=adiabatic head, in ft, $Z_s$=suction gas compressibility factor, whose magnitude is a function of suction gas temperature and pressure, $Z_d$=discharge gas compressibility factor, whose magnitude is a function of discharge gas temperature and pressure, R=specific gas constant, approximately equal to 88.793, $T_s$=suction gas temperature, in degrees Rankine k=a constant, preferably approximately 1.33, $P_d$=discharge gas pressure in psia, and $P_s$=suction gas pressure is psia.

In step 324, a gas weight flow value parameter value is calculated from certain of the process and unit operating parameters in accordance with the following equation:

$$w = \frac{ACFM * Ps(\text{psia}) * 144}{Zs * R * Ts(°R)}$$

Where:

w=Gas weight flow,

ACFM=Actual cubic feet per minute of the gas in pipeline 16, detected directly via sensor 238

$P_s$=Suction gas pressure in psia, $Z_s$=Suction gas compressibility factor, whose magnitude is a function of suction gas temperature and pressure, R=Specific Gas Constant as described above, and $T_s$=Suction gas temperature expressed in degrees Rankine.

In step 326, a brake horsepower parameter value is determined using adiabatic efficiency calculated in step 320, the adiabatic head calculated in step 322, and the gas weight flow from step 324 in accordance with the following equations:

$$HP_a = \frac{Wa}{33,000}$$

Where:

$HP_a$=adiabatic horsepower, and $W_a$=adiabatic work.

The adiabatic work is calculated in accordance with the following equation:

$$W_a = \frac{wHa}{\eta_a}$$

Where:

$W_a$=adiabatic work, w=gas weight flow, as determined above, $H_a$=adiabatic head, and $\eta_a$=adiabatic efficiency If an optional Torque Metering System is installed in PEMS 15, brake horsepower in step 326 is calculated in an alternative manner in accordance with the following equation:

$$H.P. = \frac{\text{Torque} * L.P. \text{ Speed}}{5252}$$

Where:

H.P.=Horsepower,

Torque=torque, in lb.-ft., directly measured in step 310 by sensor 270, and

L.P. Speed=Low Pressure Speed (Pump 220 compressor speed).

In step 328 a comparison is made between the measured fuel rate as determined in step 312 and the calculated fuel rate as determined in step 315, in accordance with the following equations to yield a turbine engine unit efficiency:

$$\text{Efficiency} = \frac{\text{Calculated Fuel Rate}}{\text{Actual Fuel Rate}} * 100$$

The result of this comparison is then forwarded to a biasing array in step 335. The array will bias the predicted emission rate for the turbine. When the calculated and measured Unit Efficiency differ by a first selected (alert limit) percentage, an emissions alert is generated to warn station 10 operator that engine 222 is not operating within its optimal or desired fuel usage range. If the divergence increases beyond a second, selected percentage that is greater than the first percentage (alarm limit), an emissions alarm will be generated. Preferably, in order for the alarm and the alert to be generated, the percentage difference beyond the alert/alarm limit must be maintained for a selected holding time, thus eliminating false alarms due to spurious information.

In step 330, a comparison is made between the calculated axial compressor efficiency, step 314, and the preselected expected efficiency, step 318. When the calculated efficiency differs by a selected (alert limit) percentage, an emissions alert is generated to warn station 10 operator that engine 222 is not operating within its optimal or desired axial compressor efficiency range. If the divergence increases beyond a second, selected percentage that is greater than the first percentage (alarm limit), an emissions alarm will be generated. Preferably, in order for the alarm and the alert to be generated, the percentage difference beyond the alert/alarm limit must be maintained for a selected holding time, thus eliminating false alarms due to spurious information.

In step 332, an emissions algorithm is used to calculate the emissions rate of $NO_x$, CO and THC. The emissions rate is thus calculated in accordance with the following algorithm:

Emissions in Grams/BHP.-HR.=Base
*NHPSCF*NLPSCF*RHCF*AEGTCF*RPDCF*RECF*TITCF

Where:
NHPSCF: Turbine speed correction factor
NLPSCF: Compressor speed correction factor
RHCF: Relative humidity correction factor
AEGTCF: Average exhaust gas temperature correction factor
RPDCF: Regenerator Pressure drop correction factor
RECF: Regen. Effectiveness correction factor
TITCF: Turbine Inlet Temp. correction factor
The following is a sample correction factor array:

| NHPCF ARRAY: | |
|---|---|
| HP Speed | Scale Factor |
| 100% | 1.00 |
| 95% | 1.25 |
| 90% | 1.40 |

The BASE # is determined through site stack testing in the following manner. The turbine engine/compressor unit operating parameters that may be varied are varied within a preselected range and the respective pollutant emissions rate is recorded. For example, referring to FIG. 7A and 7B, of the inputs 294, 302, 304, 306, and 308 to step 332, the H.P. speed, L.P. speed (via adjusting load), and Exhaust gas temperature can generally be varied, wherein the resulting changes in emissions are noted. Further, the remaining inputs, combustion air temperature, combustion air pressure, turbine intake temperature, turbine intake pressure, and relative humidity may vary due to ambient conditions and/or turbine wear/dirt accumulation, but generally cannot be controlled. Accordingly, these parameters are merely noted when the emissions rate is determined. After the matrix of test data has been defined, the base # is finally determined by standardizing the actual data to the N.E.M.A. standard (80 Deg. F. ambient temperature, Full HP and LP speed, 14.73 PSIA ambient pressure, and 50% relative humidity). This standardization is performed by linear interpolation. The correction factors are determined based on empirical results accumulated over time, and are a function of the operating conditions when the emission rate is calculated by PEMS 15. For example, relative humidity may actually be 70%, NOT the standard 50%, when the emission rate is calculated, and therefore this change in the underlying parameter must be recognized and corrected.

After the emissions value for each pollutant is determined in step 332, the method proceeds to step 334 where the emissions amount is biased for deviation in the exhaust gas temperature (EGT) thermocouples read in step 306. A comparator circuit contained in the software of PEMS 15 will determine the maximum deviation between a given set of thermocouples (3-12 thermocouples). This maximum deviation value will then be used as an input to a EGT biasing array to bias the emissions rate determined in step 332. Also, the maximum deviation will be used in an alert/alarm circuit (described below) to warn station personnel of the problem. This alert/alarm circuit operates in an identical fashion to the alert/alarm circuit used by the fuel rate circuit described above.

In step 336, the emission rate for each of the pollutants is respectively biased by a bias factor taken from a parameter deviation array for fuel rate deviation. It should be appreciated that the bias factor taken from the biasing array is a function of the magnitude and direction of deviation of the actual fuel rate with respect to the expected fuel rate. This step corresponds to and shows in greater detail step 124 of FIG. 2.

In step 338, the emission rate for each of the concernable pollutants is further biased by a respective bias factor taken from a second parameter deviation biasing array for axial compressor efficiency deviation. It should be appreciated that the bias factor taken from the biasing array is a function of the magnitude and direction of the actual axial compressor efficiency deviation with respect to the expected axial compressor efficiency. This step also corresponds to and shows in greater detail step 124 of FIG. 2.

For turbine units utilizing a regenerator component, in step 339, the emission rate for each of the concernable pollutants is further biased by a respective bias factor taken from a third parameter deviation biasing array for Regenerator Thermal Effectiveness deviation. It should be appreciated that the bias factor taken from the biasing array is a function of the magnitude and direction of the actual regenerator effectiveness deviation with respect to an expected regenerator effectiveness (not Illustrated). This step also corresponds to and shows in greater detail step 124 of FIG. 2.

For turbine units utilizing a regenerator component, in step 340, the emission rate for each of the concernable pollutants is further biased by a respective bis factor taken from a fourth parameter deviation biasing array for Regenerator Pressure Drop deviation. It should be appreciated that the bias factor taken from the biasing array is a function of the magnitude and direction of the actual regenerator pressure drop deviation with respect to an expected regenerator pressure drop (not illustrated). This step also corresponds to and shows in greater detail step 124 of FIG. 2.

In step 341, a parameter deviation alert/alarm may be generated (if required). Thus, when an alert or alarm limit has been exceeded in steps 328 or 330 for fuel rate and axial compressor efficiency, respectively, an alert or an alarm due to the deviation is generated in step 340.

In step 342, the determined and biased emissions rates for each pollutant are totalized for the reporting process.

Moreover, the PEMS 15 may further provide, in step 342, the capability for an operator to type in a command at network monitor 34 and input the current measured percent $O_2$ level and have PEMS 15 output the current PPM (parts per million) pollutant level. This procedure provides verification of calculated verses actual PPM level of pollutants. The following equation will be used to convert Grams/HP-HR into PPM.

$$PPM = \frac{Grams/HP - HR * Horsepower * 1*10^6 * (20.9 - \% O_2)}{K * 8710 * 20.9 * 453.6 * 915 * FuelFlow}$$

Where:
K=Factor for each pollutant
K-NOx=1.175*10-7
K-CO=7.153*10-8
K-THC=4.097*10-8
$\%O_2$=Percent oxygen entered by Operator
Fuel flow=standard cubic feet per hour (SCFH)

Further, the manner in which step 342 is accomplished corresponds to the discussion related to step 206 of the reciprocating embodiment (i.e., the frequency with which the process and unit operating parameters are measured being selectable, etc.). Moreover, an alert/alarm may be issued by PEMS 15 if the emissions rate for any of the emissions product exceeds a selected set point.

In step 344 reports, which may be similar to the format of the reports shown in FIG. 5, may be output on a daily and monthly basis.

It should be appreciated that, for both the reciprocating and turbine embodiments, either station processor 50 or engine processor 52 may perform each and every one of the method steps detailed above due to the communication capabilities provided by data highway 54; preferably, however, engine processor 52 determines the expected engine operating parameters, performs the comparison of the expected engine operating parameters and the actual engine operating parameters, determines whether the alert/alarm limits have been exceeded, and performs the emissions determining step. The station processor 50 and/or engine processor 52 perform the steps of measuring the values of the set of process and unit operating parameters, and the step of determining the values of the set of actual engine operating parameters, depending on the particular parameter being measured and the particular physical configuration of control system 14 at station 10.

It should be appreciated that the foregoing principles may be employed in a variety of energy conversion systems that convert hydrocarbon based fuel into thermal energy and, optionally, into mechanical energy, where the system produces emissions of concern and which may be advantageously monitored by the present invention. An example of such an energy conversion system may be an electric power plant that converts coal into steam, and thence into mechanical energy, and finally into electrical energy.

It is to be understood that the above description is merely exemplary rather than limiting in nature, the invention being limited only by the appended claims. Various modifications and changes may be made thereto by one of ordinary skill in the art which will embody the principles of the invention and fall within the spirit and scope thereof.

We claim:

1. In an energy conversion system for converting hydrocarbon based fuel into thermal energy to be used in a process wherein the system has associated therewith an emissions matrix, a method of determining parameter values indicative of exhaust emissions produced by the combustion of the fuel by the energy conversion system, said method comprising the steps of:
   (a) measuring a respective value for each parameter of a set of process and system parameters;
   (b) determining a respective value for each parameter of a set of actual operating parameters using the process and system parameter values measured in step (a);
   (c) calculating a respective value for each parameter of a set of expected operating parameters using the process and system parameter values measured in step (a) and predetermined tuned system operating data;
   (d) comparing each one of the actual operating parameter values with a respective one of the expected operating parameter values generated in step (c) to determine a respective operating parameter deviation;
   (e) determining a respective value for each parameter of a set of emission parameters indicative of exhaust emissions produced by the system as a function of the process and system parameter values, the emissions matrix, and the operating parameter deviations; and
   (f) biasing the emission parameter values from the emissions matrix using a set of emission biasing parameters to determine updated values of the emission parameters.

2. The method of claim 1 further including the step of generating an alarm when the system is not operating within a control envelope such that the operating parameter deviation values exceeds a respective emissions alarm limit.

3. A method for determining parameter values indicative of exhaust emissions produced by the combustion of hydrocarbon based fuel by a stationary engine having an emissions data structure, said method comprising the steps of:
   (a) measuring a respective value for each parameter of a set of process and unit operating parameters;
   (b) determining a respective value for each parameter of a set of actual engine operating parameters using the measured process and unit operating parameter values;
   (c) calculating a respective value for each parameter of a set of expected engine operating parameters using the measured process and unit operating parameter values and predetermined tuned engine operating data;
   (d) comparing each one of the actual engine operating parameter values with a respective one of the expected engine operating parameter values generated in step (c) to determine the value of a respective operating parameter deviation;
   (e) determining a respective value for each parameter of a set of emission parameters indicative of exhaust emissions produced by the engine as a function of the process and unit operating parameter values, the emissions data structure, and the operating parameter deviation values; and
   (f) biasing the emission parameter values from the emissions matrix using a set of emission biasing parameters to determine updated values of the emission parameters.

4. The method of claim 3 wherein steps (a)–(e) are performed periodically to determine the emission parameter values produced by the engine during a respective time period.

5. The method of claim 4 further comprising the step of accumulating, for every time period in a predefined time interval, a respective updated emissions amount for each emission parameter as a function of the periodically determined emission parameter values to determine a respective total emissions amount for each emission parameter over the time interval.

6. The method of claim 3 wherein step (a) includes the substeps of:
   detecting, for certain of the process and unit operating parameters, a plurality of signals indicative of the process and unit operating parameter being detected, and
   selecting, for each process and unit operating parameter having associated therewith a plurality of signals one of the signals to define the value of the respective process and unit operating parameter such that value of a selected one of the emission parameters is increased.

7. The method of claim 6 wherein the selected one of the emission parameters is $NO_x$.

8. The method of claim 3, wherein step (a) further includes the substep of generating, for each process and unit operating parameter having associated therewith a plurality of signals, an alarm when the difference between any of the respective plurality of signals exceeds a respective sensor deviation alarm limit.

9. The method of claim 8 wherein said generating step includes the substep of:
   switching control of said stationary engine from a first control method to a second control method upon generation of said alarm.

10. The method of claim 3 wherein the stationary engine is of the reciprocating type and wherein the set of process and unit operating parameters comprise engine speed and fuel differential pressure.

11. The method of claim 3 wherein the stationary engine is of the turbine type and wherein the set of process and unit operating parameters comprise H.P. Speed, L.P. Speed, and fuel differential pressure.

12. The method of claim 3 wherein the set of actual engine operating parameters includes measured fuel rate, and the set of expected engine operating parameters includes calculated fuel rate.

13. The method of claim 3 wherein step (d) includes the substep of generating a parameter deviation alert when the deviation of the actual engine operating parameter values from a respective expected engine operating parameter value exceeds a respective emissions alert limit.

14. The method of claim 3 wherein the stationary engine is of the reciprocating type and wherein step (e) includes substeps of:
   calculating engine torque using the process and unit operating parameter values from step (a); and
   determining the emission parameter values from the emissions matrix as a function of calculated engine torque and engine speed.

15. The method of claim 14 wherein step (e) includes the further substep of:
   biasing the determined emission parameter values from the emissions matrix using the operating parameter deviation values.

16. The method of claim 3 wherein the stationary engine is of the turbine type and the set of process and unit operating parameters includes exhaust gas temperature, H.P. speed, and L.P. speed, and wherein step (e) includes the substep of:
   determining the emission parameter values from the emissions algorithm as a function of exhaust gas temperature, H.P. speed, and L.P. speed.

17. The method of claim 3 further including the step of generating an alarm when the engine is not operating within a control envelope such that the deviation of the actual engine operating parameter values from a respective expected engine operating parameter value exceeds a respective parameter deviation alarm limit.

18. The method of claim 3 wherein the set of emission parameters comprises $NO_x$, CO, and total hydrocarbons.

19. The method of claim 3 wherein the stationary engine is of the reciprocating type and the set of emissions biasing parameters comprises relative humidity, power cylinder exhaust temperature deviations, and air manifold temperature.

20. The method of claim 3 wherein the stationary engine is of the turbine type and the set of emission biasing parameters includes exhaust gas temperature and fuel usage deviation.

21. A system for determining parameter values indicative of the exhaust emissions produced by the combustion of hydrocarbon based fuel by a stationary engine having an emissions matrix, said system comprising:
   means for measuring a respective value for each parameter of a set of process and unit operating parameters, including at least one sensor for detecting one of the process and unit operating parameters and generating a signal indicative of the process and unit operating parameter detected;
   means responsive to said process and unit operating parameter values for determining a respective value for each parameter of a set of actual engine operating parameters;
   means responsive to said process and unit operating parameter values for calculating a respective value for each parameter of a set of expected engine operating parameters, said calculating means including means for storing predetermined tuned engine operating data;
   means responsive to said actual engine operating parameter values and said expected engine operating parameter values for comparing said sets of actual engine operating parameters and expected engine operating parameters and generating a respective operating parameter deviation signal;
   means responsive to said process and unit operating parameter values, said emissions matrix, and said operating parameter deviation signals for determining a respective value for each parameter of a set of emission parameters indicative of exhaust emissions produced by said engine; and
   means for biasing the emission parameter values from the emissions matrix using a set of emission biasing parameters to determine updated values of the emission parameters.

22. The system of claim 21 wherein at least certain of the process and unit operating parameters are detected by a respective plurality of sensors generating a plurality of signals, said measuring means being operative to select one of said signals.

23. The system of claim 22 wherein said measuring means includes a sensor deviation alarm generating means responsive to each process and unit operating parameter having associated therewith a plurality of signals for generating an alarm when the difference between any of the respective plurality of signals exceeds a respective sensor deviation alarm limit.

24. The system of claim 21 wherein the stationary engine is of the reciprocating type and wherein said measuring means includes a suction gas temperature sensor, a suction gas pressure sensor, a discharge gas pressure sensor, an engine speed sensor, an air manifold temperature sensor, a fuel differential pressure sensor, a fuel header pressure sensor, a fuel header temperature sensor, and an air manifold pressure sensor for detecting process and unit operating parameters.

25. The system of claim 21, wherein the stationary engine is of the turbine type and wherein said measuring means includes a suction gas temperature sensor, a suction gas pressure sensor, a discharge gas pressure sensor, a discharge gas temperature sensor, a fuel differential pressure sensor, a L.P. Speed sensor, a turbine intake pressure sensor, a turbine intake temperature, and a relative humidity sensor, for measuring said process and unit operating parameters.

26. The system of claim 21 wherein the stationary engine is of the reciprocating type and wherein said emissions determining means includes means responsive to said process and unit operating parameter values for calculating engine torque, and means responsive to said calculated engine torque and engine speed for determining said emission parameter values from said emissions matrix.

27. The system of claim 21 wherein said stationary engine is of the turbine type and said measuring means includes means for measuring the value of exhaust gas temperature, H.P. speed and L.P. speed and wherein said emissions determining means includes means responsive to exhaust gas temperature, H.P. speed and L.P. speed for determining said emission parameter values from said emissions algorithm.

28. A method for determining parameter values indicative of the exhaust emissions produced by the combustion of hydrocarbon based fuel by a stationary engine having an emissions data structure, said method comprising the steps of:

(a) measuring a respective value for each parameter of a set of process and unit operating parameters;

(b) determining a respective value for each parameter of a set of emission parameters indicative of exhaust emissions produced by the engine as a function of the process and unit operating parameter values, and the emissions data structure;

(c) selecting a measured process and unit operating parameter having a value whose magnitude changes as a function of engine tune;

(d) biasing the values of the emission parameters as a function of the selected process and unit operating parameter to determine updated values for the set of emission parameters.

29. The method of claim 28 wherein step (d) includes the substeps of:

determining a spark condition as a selected measured process and unit operating parameter; and biasing the values of the emission parameters as a function of spark condition to determine updated values for the set of emission parameters.

* * * * *